US009306626B2

(12) United States Patent
Hall et al.

(10) Patent No.: US 9,306,626 B2
(45) Date of Patent: Apr. 5, 2016

(54) NFC DEVICE CONTEXT DETERMINATION THROUGH PROXIMITY GESTURAL MOVEMENT DETECTION

(75) Inventors: Steven D. Hall, Olivenhain, CA (US); Robert W. Brand, La Jolla, CA (US)

(73) Assignee: Broadcom Corporation, Irvine, CA (US)

( * ) Notice: Subject to any disclaimer, the term of this patent is extended or adjusted under 35 U.S.C. 154(b) by 351 days.

(21) Appl. No.: 13/473,222

(22) Filed: May 16, 2012

(65) Prior Publication Data

US 2013/0309964 A1 Nov. 21, 2013

(51) Int. Cl.
*H04B 5/00* (2006.01)

(52) U.S. Cl.
CPC ........................ *H04B 5/00* (2013.01)

(58) Field of Classification Search
CPC ......... G06F 1/163; G06F 3/014; G06F 3/017; G06F 3/041; G06F 2200/1637; G06F 1/1694; G06F 21/35; G06F 2203/0381; G06F 3/0346; G06F 3/044; H04B 5/0056; H04B 5/0037; H04B 5/0081; H04B 5/02; H04B 5/00; H04B 5/0075; H04B 5/0093; H04B 5/0087
USPC .......... 455/41.1; 340/825.72, 13.24; 379/55.1
See application file for complete search history.

(56) References Cited

U.S. PATENT DOCUMENTS

| | | | | |
|---|---|---|---|---|
| 6,323,770 | B1 * | 11/2001 | Dames | 340/572.7 |
| 8,565,791 | B1 * | 10/2013 | Schilit et al. | 455/456.3 |
| 8,670,709 | B2 * | 3/2014 | Griffin et al. | 455/41.1 |
| 2007/0236336 | A1 | 10/2007 | Borcherding | |
| 2008/0090519 | A1 * | 4/2008 | Rofougaran et al. | 455/41.1 |
| 2010/0033299 | A1 | 2/2010 | Davis | |

(Continued)

FOREIGN PATENT DOCUMENTS

| | | | |
|---|---|---|---|
| CN | 101645129 | * | 2/2010 |
| CN | 101645129 A | | 2/2010 |

(Continued)

OTHER PUBLICATIONS

"Identification cards—Contactless integrated circuit(s) cards—Proximity cards—Part 3: Initialization and anticollision," Final Committee Draft, ISO/IEC FCD 14443-3, Jun. 11, 1999; 48 pages.

(Continued)

*Primary Examiner* — Sonny Trinh
*Assistant Examiner* — Angelica M Perez
(74) *Attorney, Agent, or Firm* — Sterne, Kessler, Goldstein & Fox P.L.L.C.

(57) ABSTRACT

An apparatus and system are provided for interpreting the gestural path of a first NFC device within NFC range of a second NFC device, or the gestural path of the second NFC device within range of the first NFC device, to determine context for a pre-determined function. The second NFC device includes a plurality of inductive coupling elements, each element configured to output a signal when within range of the first NFC device. A controller module receives the signal from each element when the first NFC device is within range and determines a path of the first NFC device across the second NFC device based on a time difference of receipt at the controller of the signals. The plurality of inductive coupling elements may be active or passive, and interact with the first NFC device in a peer-to-peer mode or read/write mode, depending on the configuration of each device.

16 Claims, 15 Drawing Sheets

(56) References Cited

U.S. PATENT DOCUMENTS

| | | | |
|---|---|---|---|
| 2011/0117839 | A1 | 5/2011 | Rhelimi |
| 2012/0064826 | A1 | 3/2012 | Darwhekar et al. |
| 2012/0077584 | A1 | 3/2012 | Sarmenta |
| 2012/0116861 | A1 | 5/2012 | Dobyns |
| 2014/0118147 | A1* | 5/2014 | Davis .................. 340/572.1 |

FOREIGN PATENT DOCUMENTS

| | | |
|---|---|---|
| CN | 102177535 A | 9/2011 |
| JP | 2011-526011 A | 9/2011 |
| WO | WO 2008/117029 A2 | 10/2008 |

OTHER PUBLICATIONS

"Identification cards—Contactless integrated circuit(s) cards—Vicinity cards—Part 3: Anti-collision and transmission protocol," ISO/IEC FCD 15693-3, Mar. 10, 2000; 50 pages.

"Information technology—Telecommunications and information exchange between systems—Near Field Communication—Interface and Protocol (NFCIP-1)," First Edition, ISO/IEC 18092, Apr. 1, 2004; 66 pages.

"Information technology—Telecommunications and information exchange between systems—Near Field Communication Interface and Protocol-2 (NFCIP-2)," First Edition, ISO/IEC 21481, Jan. 15, 2005; 12 pages.

"NFC Activity Specification," Technical Specification, NFC Forum, Activity 1.0, Nov. 18, 2010; 117 pages.

English-Language Abstract for Chinese Patent Publication No. CN 101645129 A, published Feb. 10, 2010; 1 page.

Office Action directed to related Chinese Patent Application No. 201210592953.2, mailed on Dec. 22, 2014; 9 pages.

European Search Report directed toward related European Application No. 12006413.4, dated Sep. 29, 2014 from the European Patent Office, The Hague; 5 pages.

Office Action for Taiwanese Patent Application No. 10320772110, mailed on Jun. 9, 2014.

* cited by examiner

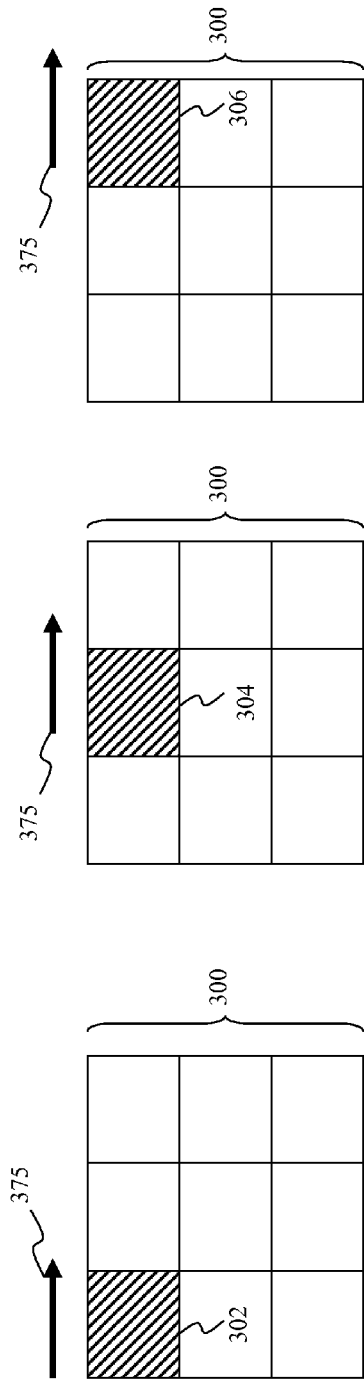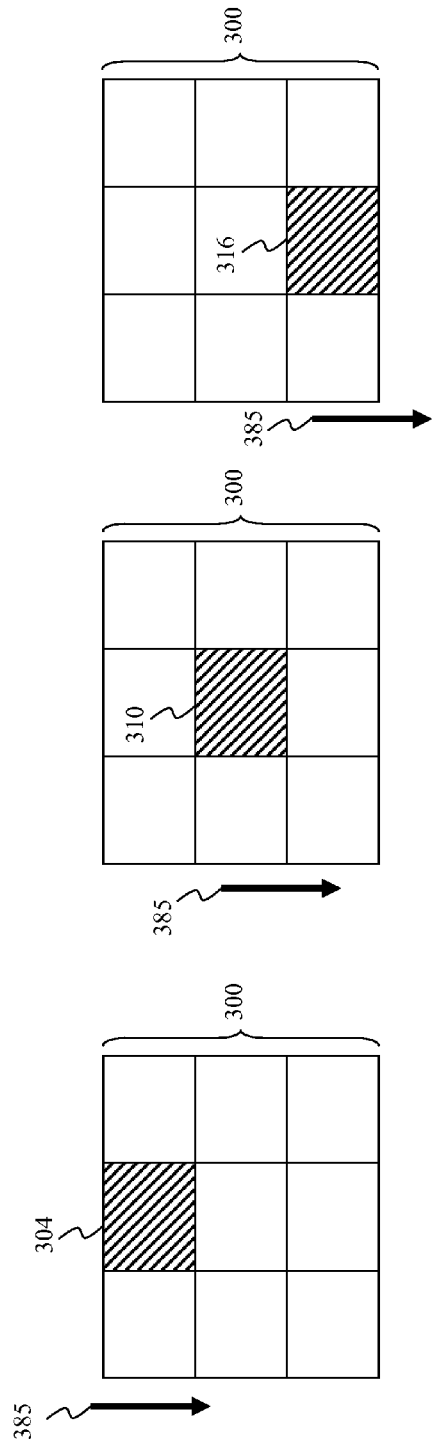
FIG. 3A FIG. 3B FIG. 3C FIG. 3D FIG. 3E FIG. 3F

NFC DEVICE CONTEXT DETERMINATION THROUGH PROXIMITY GESTURAL MOVEMENT DETECTION

BACKGROUND

1. Field of Disclosure

The present disclosure relates generally to Near Field Communication (NFC) devices and the operation and application thereof. More particularly, the present disclosure relates to methods and apparatuses for using motion of a first NFC device to communicate with a second NFC device.

2. Related Art

Products incorporating NFC capabilities are sometimes referred to in the field as NFC-enabled or NFC capable. For example, mobile phones or handsets that include NFC capabilities are referred to as NFC-enabled. NFC allows two similarly equipped devices to exchange data with each other over short distances. Although a strict definition for the range of short distances is not agreed upon in the field, short range for NFC usually is thought of as being less than 4 cm. NFC generally operates at 13.56 MHz and at data rates ranging from about 106 kbit/s to 848 kbit/s. NFC generally involves a reader (or initiator) and a tag (or target). The reader actively generates a magnetic field that can power the tag. This enables NFC tags to be configured so as to have very simple form factors such as identification tags, stickers, key fobs, or cards that do not require batteries. NFC peer-to-peer communication is also possible, where both devices are powered.

NFC has been used in NFC-enabled devices to function as a replacement for a conventional user interface button. Conventionally, a user navigates through various menus and/or sub-menus to a specific menu in a first NFC-enabled device, such as a mobile phone, and invokes an application to run in the foreground and receive NFC events and data when interacting with a second NFC-enabled device, or registers one or more background applications that are invoked when data is received that matches user-registered criteria. The user taps the first NFC-enabled device to initiate a desired action between these NFC-enabled devices by either physically touching the two or bringing them within a proximate range of each other. The action that the first NFC-enabled device takes in response to the transaction depends on either the user-initiated foreground application/configured menu or the content of the data read from the second NFC-enabled device. Such transactions depend on the user's interaction with a user interface of the mobile phone to initiate transactions.

BRIEF DESCRIPTION OF THE DRAWINGS/FIGURES

The present disclosure is described with reference to the accompanying drawings. In the drawings, like reference numbers generally indicate identical, functionally similar, and/or structurally similar elements. Additionally, the left most digit(s) of a reference number identifies the drawing in which an element first appears.

FIGS. 3A-3F illustrate exemplary directions a first NFC device may move across a second NFC device inductive element structure;

Figure 1:
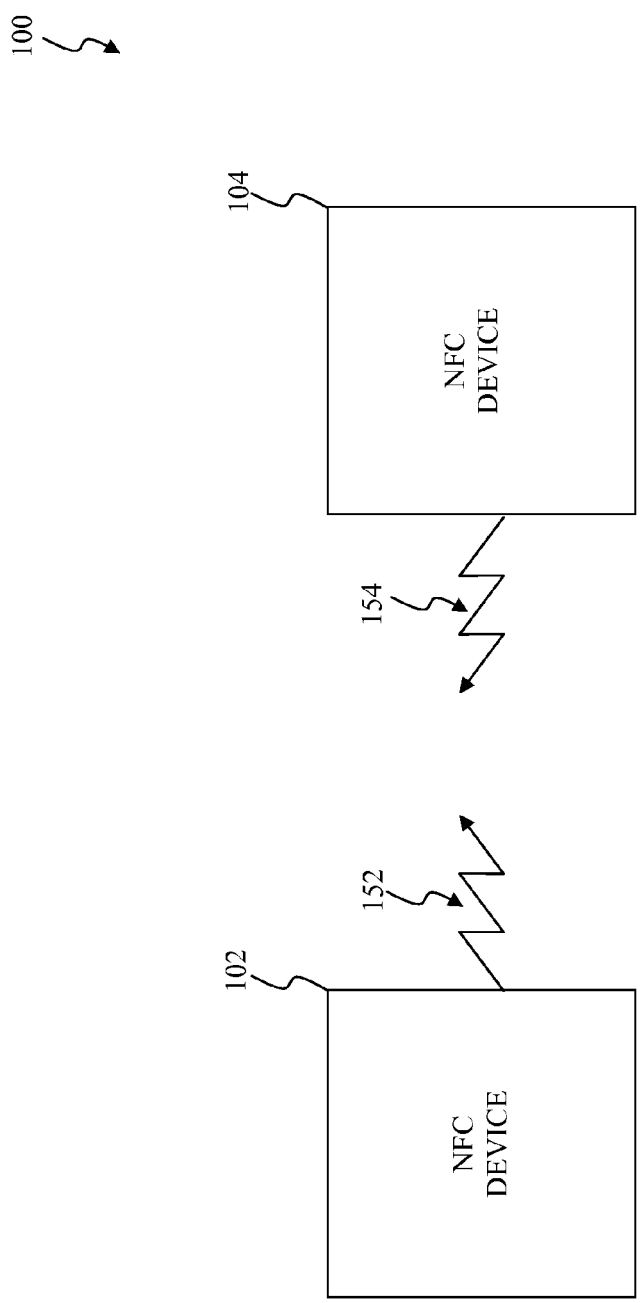
FIG. 1 is a block diagram illustrating a near field communication (NFC) environment in accordance with the present disclosure.

The disclosure will now be described with reference to the accompanying drawings.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to effect such feature, structure, or characteristic in connection with other exemplary embodiments whether or not explicitly described.

The exemplary embodiments described herein are provided for illustrative purposes and are not limiting. Other exemplary embodiments are possible, and modifications may be made to the exemplary embodiments within the spirit and scope of the disclosure. Therefore, the Detailed Description is not meant to limit the disclosure. Rather, the scope of the disclosure is defined only in accordance with the following claims and their equivalents.

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, and instructions may be described herein as performing certain actions. However, it should be appreciated that such descriptions are merely for convenience and that such actions in fact result from computing devices, processors, controllers, or other devices executing the firmware, software, routines, instructions, etc.

The following Detailed Description of the exemplary embodiments will so fully reveal the general nature of the disclosure that others can, by applying knowledge of those skilled in the relevant art(s), readily modify and/or adapt for various applications such exemplary embodiments, without undue experimentation, without departing from the spirit and scope of the present disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although the description of the present disclosure is to be described in terms of NFC devices and NFC enabled devices, those skilled in the relevant art(s) will recognize that the present disclosure may be applicable to other communications that use the near field and/or the far field without departing from the spirit and scope of the present disclosure. For example, although the present disclosure is to be described using NFC capable devices, those skilled in the relevant art(s) will recognize that functions of these NFC capable devices may be applicable to other communications devices that use the near field and/or the far field without departing from the spirit and scope of the present disclosure.

TERMINOLOGY

As used herein, the term "tag" refers to a wireless device that is configurable to operate in a target, or tag, mode of operation in accordance with various NFC or RFID standards. A tag operating in the target mode of operation responds to the initiation of communication by a reader or communicator when the tag is within the proximity of the reader or communicator's generated field. In some situations, the tag is configurable to derive or harvest power from a magnetic field generated by another wireless device that is operating in a initiator, or reader, mode of operation.

A "reader" refers to a wireless device that is capable of operating in an initiator mode, or reader, mode of operation in accordance with various NFC or RFID standards. The reader can generate a magnetic field and modulate information onto the magnetic field to communicate with another wireless device that is operating in the target mode of operation.

A "communicator" refers to a wireless device that is configurable to operate in the initiator mode or in the target mode and may switch between these two modes.

As used herein, "NFC device" represents a standalone device, a discrete device, or NFC capable device and could be a tag, reader, or communicator, depending on the environment of the particular embodiment.

As used herein, the term "accelerometer" refers to an instrumentality that measures acceleration or translational motion. Generally, commercially available accelerometers measure linear acceleration. Such accelerometers are typically implemented as microelectromechanical systems (MEMS) structures on integrated circuits. An "angular accelerometer" measures the rate of change of angular rotation. The expression "acceleration event" refers to a change in acceleration in one or more axes that together or separately exceed predetermined acceleration threshold values.

Exemplary Near Field Communications (NFC) Environment

FIG. 1 illustrates a block diagram of a NFC environment according to an exemplary embodiment of the disclosure. A NFC environment 100 provides wireless communication of information, such as one or more commands and/or data, among a first NFC device 102 and a second NFC device 104 that are sufficiently proximate to each other. The first NFC device 102 and/or the second NFC device 104 may be implemented as a standalone or a discrete device or may be incorporated within or coupled to another electrical device or host device such as a mobile telephone, a portable computing device, another computing device such as a laptop, tablet computer, or a desktop computer, a computer peripheral such as a printer, a portable audio and/or video player, a payment system, a ticketing writing system such as a parking ticketing system, a bus ticketing system, a train ticketing system or an entrance ticketing system to provide some examples, or in a ticket reading system, a toy, a game, a poster, packaging, advertising material, a product inventory checking system and/or any other suitable electronic device that will be apparent to those skilled in the relevant art(s) without departing from the spirit and scope of the disclosure. Herein, when incorporated within or coupled to another electrical device or host device, this type of NFC device may be referred to as a NFC capable device or NFC-enabled device.

The first NFC device 102 generates a magnetic field and probes the magnetic field for the second NFC device 104. The first NFC device 102 and the second NFC device 104 may be implemented using a Type A standard, a Type B standard, a Type F (FeliCa) standard, a vicinity standard, and/or any other suitable communications standard that will be apparent to those skilled in the relevant art(s) without departing from the spirit and scope of the present disclosure. The Type A and Type B standards are further defined in the "NFC Forum: NFC Activity Specification: Technical Specification, NFC Forum™ Activity 1.0 NFCForum-TS-Activity-1.0," published Nov. 18, 2010 (hereinafter the "NFC Activity Specification") and/or ISO/IEC 14443-3, "Identification cards—Contactless integrated circuit(s) cards—Proximity cards—Part 3: Initialization and anticollision," published on Jun. 11, 1999, which are incorporated herein by reference in their entirety. The Type F standard is further defined in the NFC Activity Specification. The Vicinity standard is further defined in ISO/IEC 15693-3:2009, "Identification cards—Contactless integrated circuit(s) cards—Vicinity cards—Part 3: Anti-collision and transmission protocol," published on Apr. 6, 2009 (hereinafter the "Vicinity Specification").

Upon establishing communication with the second NFC device 104, the first NFC device 102 modulates its corresponding information onto a first carrier wave and generates a first magnetic field by applying the modulated information to a first antenna of the first NFC device to provide a first information communication 152. The first NFC device 102 continues to apply the first carrier wave without its corresponding information to continue to provide the first information communication 152 once the information has been transferred to the second NFC device 104. The first NFC device 102 is sufficiently proximate to the second NFC device 104 such that the first information communication 152 is inductively coupled onto a second antenna of the second NFC device 104.

The second NFC device 104 derives or harvests power from the first information communication 152 to recover, to process, and/or to provide a response to the information. The second NFC device 104 demodulates the first information communication 152 to recover and/or to process the information. The second NFC device 104 may respond to the information by applying its corresponding information to the first carrier wave that is inductively coupled onto the second antenna to provide the second modulated information communication 154. In some situations, the first NFC device 102 and the second NFC device 104 may operate in a peer-to-peer relationship where, for example, one or both are NFC communicators that are capable of operating in either initiator or target mode. In such situations, necessary negotiation between the devices would occur to establish which would operate in initiator mode and which in target mode for the session.

Further operations of the first NFC device 102 and/or the second NFC device 104 may be described in International Standard ISO/IEC 18092:2004(E), "Information Technology—Telecommunications and Information Exchange Between Systems—Near Field Communication—Interface and Protocol (NFCIP-1)," published on Apr. 1, 2004 and International Standard ISO/IEC 21481:2005(E), "Information Technology—Telecommunications and Information Exchange Between Systems—Near Field Communication—Interface and Protocol-2 (NFCIP-2)," published on Jan. 15, 2005, each of which is incorporated by reference herein in its entirety.

Context Through Gestural Detection

Figure 2A:
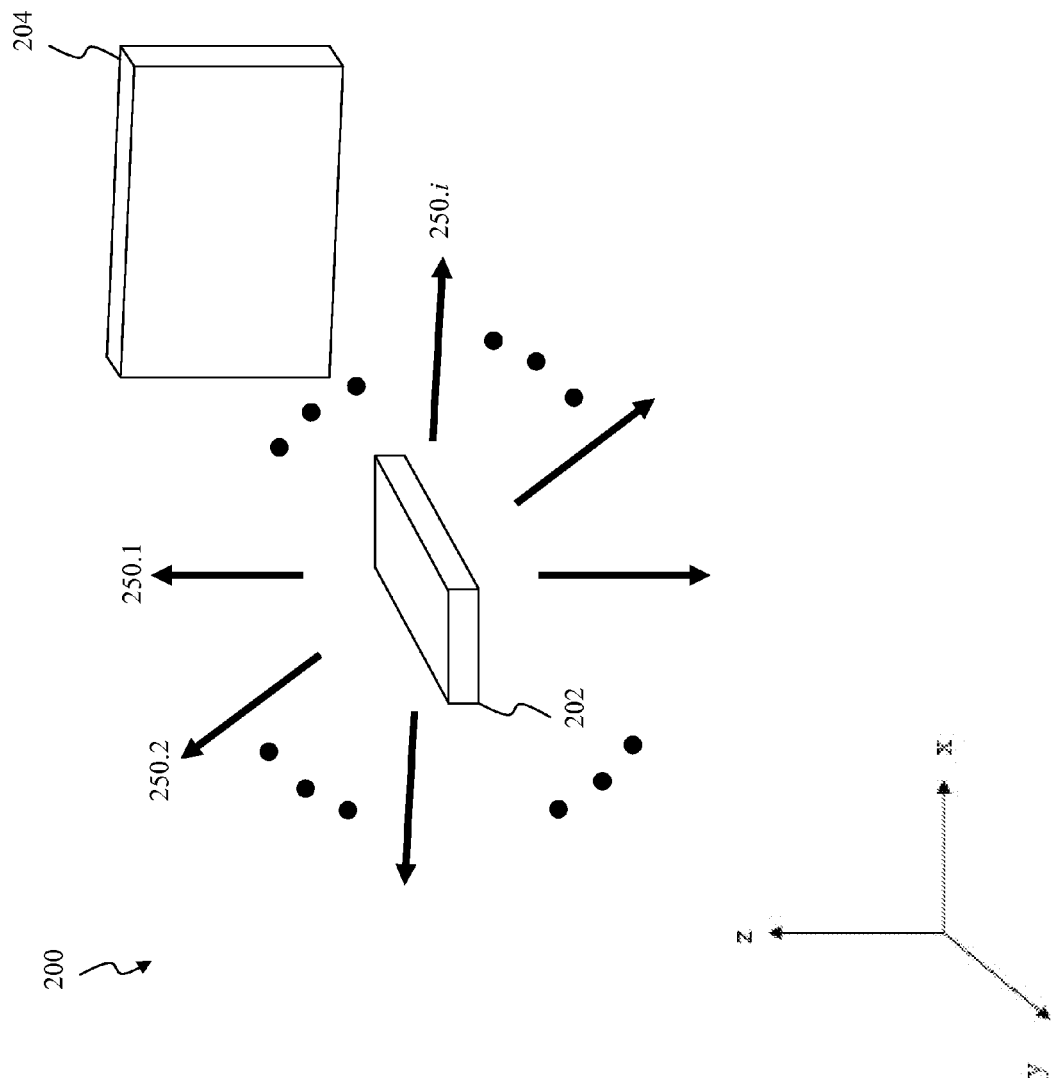
FIG. 2A is a block diagram illustrating the axes (x, y, z) and directions one NFC device can move in relation to another NFC device.

FIG. 2A illustrates a block diagram that depicts, on a high level, two NFC capable devices 202 and 204 interacting with one another in three-dimensional space in an interactive environment 200. A NFC device 202 moves in various directions in proximity to a NFC device 204. In some situations, the NFC device 202 applies a magnetic field to various parts of the NFC device 204 as it moves. In other situations, the NFC device 202 moves through one or more magnetic fields generated by the NFC device 204. In both of these situations, the NFC device 204 is able to detect the motion of the NFC device 202 based upon changes in magnetic fields that result from the movement of the NFC device 202. The NFC capable devices 202 and 204 can represent exemplary embodiments of the first NFC device 102 and the second NFC device 104.

In one embodiment, the NFC capable device 202 can be configured, or is configurable, to operate in the initiator mode, or reader, mode of operation and the NFC capable device 204 can be configured, or is configurable, to operate in the target, or tag, mode of operation. In this embodiment, the NFC capable device 204 can include multiple tags that can be configured and arranged to form an array of tags. In another embodiment, NFC capable device 202 can be configured, or is configurable, to operate in the target, or tag, mode of operation and NFC capable device 204 can be configured, or is configurable, to operate in the initiator mode, or reader, mode of operation. In this embodiment, NFC capable device 204 can include multiple NFC coils that can be configured and arranged to form an array of NFC coils.

In each of these embodiments, a number of tags in the array of tags and/or a number of NFC coils in the array of coils determines degrees of freedom 250.1 through 250.$i$ within the interactive environment 200 for gestural movement. For example, an array of tags and/or an array of NFC coils having a minimum of two tags and/or NFC coils allows for a single degree of freedom from among the degrees of freedom 250.1 through 250.$i$ within the interactive environment 200 for gestural movement. In this example, the single degree of freedom allows the NFC capable device 204 to detect motion of the NFC capable device 202 along a substantially horizontal axis, such as the x-axis, y-axis, or z-axis as shown in FIG. 2A. As another example, adding more tags to the array of tags and/or more coils to the array of coils allows from more degrees of freedom from among the degrees of freedom 250.1 through 250.$i$ to be present within the interactive environment 200. In this other example, simple gestures, such as motion of the NFC capable device 202 along one of the degrees of freedom 250.1 through 250.$i$ to provide an example, and/or more complicated gestures, such as motion of the NFC capable device 202 along more than one of the degrees of freedom 250.1 through 250.$i$ or combinations of the degrees of freedom 250.1 through 250.$i$ to provide some examples, can be detected by the NFC capable device 204.

Following is a discussion of several embodiments of the NFC capable devices 202 and 204 in several interactive environments.

Figure 2B:
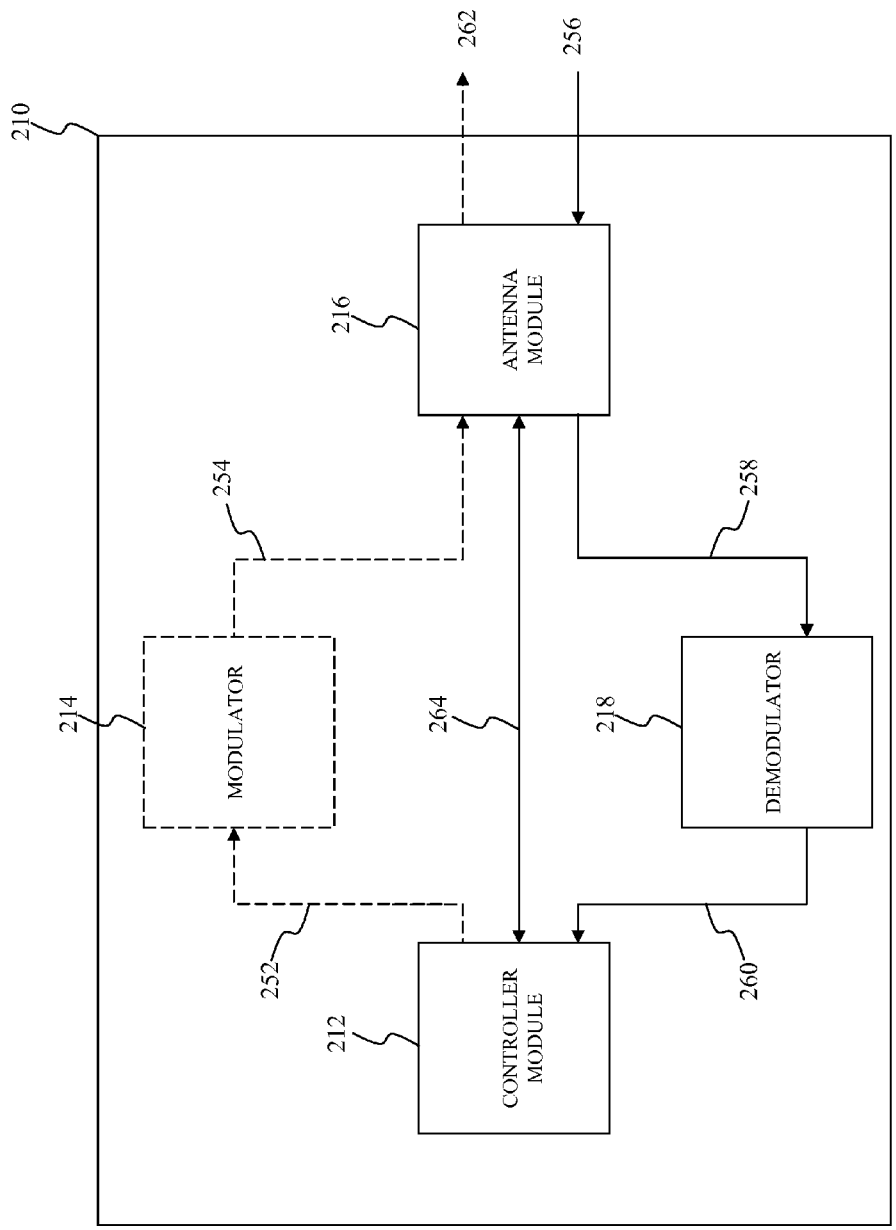
FIG. 2B illustrates a block diagram of a NFC device that may be used to detect a presence of other NFC capable devices according to an exemplary embodiment of the present disclosure.

FIG. 2B illustrates a block diagram of a NFC device that may be used according to exemplary embodiments of the present disclosure. A NFC device 210 may be configurable to operate in a target mode of operation to respond to the presence of another NFC capable device within its environment that generates a magnetic field. It may also be configurable to operate in an initiator mode of operation to generate a magnetic field and initiate communication with other NFC capable devices. It should be noted that FIG. 2B illustrates only the target and initiator modes of operation. Those skilled in the relevant art(s) will recognize that the NFC device 210 may be configured to operate in other modes of operation, such as a peer (P2P) communication mode to provide an example, without departing from the spirit and scope of the present disclosure. The NFC device 210 includes a controller module 212, a modulator module 214, an antenna module 216, and a demodulator module 218. The NFC device 210 may represent an exemplary embodiment of the first NFC device 102, the NFC capable device 202, and/or the NFC capable device 204.

The antenna module 216 includes multiple inductive coupling elements, such as one or more tags and/or one or more NFC coils to provide some examples. Some of these multiple inductive coupling elements can be used to communicate information from the NFC device 210 to other NFC capable devices. In the initiator mode of operation, a modulated communication sequence 254 can be applied to these multiple inductive coupling elements to generate a magnetic field to provide a communication sequence 262. The modulated communication sequence 254 may include information that is modulated onto a carrier wave or simply the carrier wave itself. Additionally, these multiple inductive coupling elements observe the magnetic field for an inbound sequence 256 to provide an observed inbound sequence 258. In the target mode of operation, these multiple inductive coupling elements can modulate a communication sequence 252 onto a magnetic field that is generated from another NFC capable device to provide the communication sequence 262. Additionally, these multiple inductive coupling elements observe the magnetic field for the inbound sequence 256 to provide the observed inbound sequence 258.

Other ones of these multiple inductive coupling elements can be used to detect motion of other NFC capable devices. Generally, magnetic fields from the NFC device 210, as well as other magnetic fields from other NFC capable devices, can induce various currents and/or voltages onto these other inductive coupling elements. Typically, magnitudes of these various currents and/or voltages are related to strengths of these magnetic fields.

The demodulator module 218 demodulates the observed inbound sequence 258 using any suitable analog or digital modulation technique to provide a recovered signal 260. The suitable analog or digital modulation technique may include amplitude modulation (AM), frequency modulation (FM), phase modulation (PM), phase shift keying (PSK), frequency shift keying (FSK), amplitude shift keying (ASK), quadrature amplitude modulation (QAM) and/or any other suitable modulation technique that will be apparent to those skilled in the relevant art(s).

In operation, the controller module 212 is configured to receive signals from the antenna module 216. The controller module 212 receives the recovered signal 260 after demodulation from the antenna module 216. In embodiments of the present disclosure, the controller module 212 may receive various analog and/or digital signals from the antenna module 216 via a bidirectional communication path 264. These various analog and/or digital signals can represent the various currents and/or voltages, or indications thereof, from the antenna module 216. In some situations, the controller module 212 may also include an analog-to-digital (A/D) converter when the controller module 212 is configured to receive analog signals. The A/D converter could alternatively be located elsewhere, such as part of the inductive elements or along a data path between the inductive elements and the controller module 212, as will be apparent to those skilled in the relevant art(s). The controller module 212 may include a timer to assist in determining the order of signal assertion from the inductive elements of the antenna module 216.

The controller module 212 may generate a communication sequence 252, such as an envelope of a detection sequence and/or a stream of data to provide some examples, in response to a command. The command may be provided to the controller module 212 from one or more data storage devices such as one or more contactless transponders, one or more contactless tags, one or more contactless smartcards, any other machine-readable mediums that will be apparent to those skilled in the relevant art(s) without departing from the spirit and scope of the disclosure, or any combination thereof. The other machine-readable medium may include, but is not limited to, read only memory (ROM), random access memory (RAM), magnetic disk storage media, optical storage media, flash memory devices, electrical, optical, acoustical or other forms of propagated signals such as carrier waves, infrared signals, and digital signals to provide some examples. The controller module 212 may also receive the command from a user interface such as a touch-screen display, an alphanumeric keypad, a microphone, a mouse, a speaker, or any other suitable user interface that will be apparent to those skilled in the relevant art(s) without departing from the spirit and scope of the disclosure to provide some examples. The controller module 212 may further receive the command from other electrical devices or host devices coupled to the NFC device 210.

Additionally, the controller module 212 may determine a motion, also referred to as a swipe, of another NFC capable device based upon the various currents and/or voltages from the antenna module 216 via the bidirectional communication path 264. For example, the various currents and/or voltages may be used to determine a motion of another NFC capable device as it moves. The various currents and/or voltages from the multiple inductive coupling elements vary as this other device moves through the various magnetic fields generated by and/or induced onto the antenna module 216. The controller module 212 may use this variation in the various currents and/or voltages to determine the motion of this other device. The controller module 212 may compare this motion to various stored motions that are associated with various pre-determined functions or commands. The controller module 212 may select, and, optionally, execute the pre-determined functions or commands corresponding to the stored motion that matches the determined motion of the other NFC capable device.

Though the discussion above considers the controller module 212 as part of the NFC device 210, the controller module 212 could operate on its own as a modem controller. In the alternative, the controller module 212 could operate in conjunction with a host computing element, when the NFC device 210 is incorporated with a host device. In such a situation, the controller module 212 would not have to execute the logic to perform the above functions itself, but rather could pass data through to the host computing element, or even outside of the host device, for processing. For the sake of brevity, the discussion of the embodiments below will be in terms of the controller module 212 being part of the NFC device of each respective embodiment, though the execution could be performed on the controller module 212, a host computing element, or some other outside computing element, as just discussed.

Pre-determined functions controlled by specific swipes or swipe patterns include, for example, enhanced security in key cards. Thus, in addition to reading the key card, a security system could require unique swipes, or combinations of swipes, to complete authentication. In one example, that could include a combination of a left-to-right swipe, a top-to-bottom swipe, and a right-to-left swipe. There are many different possible combinations, as will be apparent to those skilled in the relevant art(s). Other pre-determined functions controlled by specific swipes or swipe patterns could include, for example, using a NFC-enabled mobile phone to swipe with a particular pattern in the near field of a NFC-enabled TV to activate play of a movie or station. The swipe of a NFC-enabled device in the near field of another NFC-enabled device that has video conferencing software could activate a video conference session. Thus, the pre-determined functions may be caused to be taken regardless of the user's interaction with the UI of the NFC capable device 202 or 204 (depending on the situation), even when the user takes no action on the UI, and without using the data of a single NFC device 210 to determine context, except for as otherwise discussed in the various embodiments below. These are by way of example only, as many other applications are possible.

The modulator module 214 modulates the communication sequence 252 onto a carrier wave using any suitable analog or digital modulation technique to provide the modulated communication sequence 254. The suitable analog or digital modulation technique may include amplitude modulation (AM), frequency modulation (FM), phase modulation (PM), phase shift keying (PSK), frequency shift keying (FSK), amplitude shift keying (ASK), quadrature amplitude modulation (QAM) and/or any other suitable modulation technique that will be apparent to those skilled in the relevant art(s). The modulation data path is depicted in dashed lines in FIG. 2B.

The NFC device 210 may also include a power harvesting module, for example when configured to operate in the target mode of operation. The power harvesting module may harvest power for the NFC device 210 from the observed inbound sequence 258. The power harvesting module may further include a rectifier module to provide a rectified power (DC power), a regulator controller to provide a regulation control signal, and a regulator module for protecting the NFC device 210 against overvoltage, which may occur when the inbound sequence 256 at the antenna module 216 is too strong, based on the regulation control signal.

One or more of the elements discussed above may be optional depending upon the mode of operation, e.g., modulator 214 may be optional when the NFC device 210 is configured to operate in the target mode of operation.

FIGS. 3A-3F illustrate exemplary motions of NFC devices. NFC capable devices 202 and 204 from FIG. 2 will be used by way of example. In FIGS. 3A-3F, a plurality of inductive coupling elements 300, including inductive coupling elements 302, 304, 306, 310, and 316, are configured and arranged to form an array. The inductive coupling elements 300 may represent one or more tags and/or or more NFC coils. The number of inductive coupling elements in the inductive coupling elements 300, as well as their configuration and arrangement, are depicted in FIGS. 3A-3F by way of example only. Those skilled in the relevant art(s) will recognize that the inductive coupling elements 300 may have more or fewer individual inductive elements than those shown in FIGS. 3A-3F and may be configured in different configurations and arrangements without departing from the spirit and scope of the present disclosure. The inductive coupling elements 300 may be implemented as part of the antenna module 216.

FIGS. 3A-3C depict a horizontal swipe across the inductive coupling elements 300. FIGS. 3D-3F depict a vertical swipe down the inductive coupling elements 300. As will be apparent to those skilled in the relevant art(s), other swipe directions are possible without departing from the spirit and scope of the present disclosure. For example, swipes from the top left to the bottom right, or bottom left to the top right, or the reverse direction of any of the above, or combinations of any of the above are also possible. Fewer or more swipe directions are possible as fewer or more inductive coupling elements are included, respectively, in the inductive coupling elements 300.

In FIG. 3A, the NFC capable device 202 begins a swiping motion 375 horizontally across the top row of inductive coupling elements 300 of NFC capable device 204. The NFC capable device 202 first passes over inductive coupling element 302. Typically, a current within and/or voltage on the coupling element 302 varies from a first current and/or voltage to a second current and/or voltage as the NFC capable device 202 passes over the inductive coupling element 302. The current within and/or voltage on other inductive coupling elements from among the inductive coupling elements 300 typically are unaffected or minimally affected as the NFC capable device 202 passes over the inductive coupling element 302.

In FIG. 3B, swipe 375 of the NFC capable device 202 finishes passing over the inductive coupling element 302 and then passes over inductive coupling element 304. Typically, a current within and/or voltage on the coupling element 304 varies from a first current and/or voltage to a second current and/or voltage as the NFC capable device 202 passes over the inductive coupling element 304. The current within and/or voltage on other inductive coupling elements from among the inductive coupling elements 300 typically are unaffected or minimally affected as the NFC capable device 202 passes over the inductive coupling element 304.

In FIG. 3C, swipe 375 of the NFC capable device 202 finishes passing over the inductive coupling element 304 and then passes over inductive coupling element 306. Typically, a current within and/or voltage on the coupling element 306 varies from a first current and/or voltage to a second current and/or voltage as the NFC capable device 202 passes over the inductive coupling element 306. The current within and/or voltage on other inductive coupling elements from among the inductive coupling elements 300 typically are unaffected or minimally affected as the NFC capable device 202 passes over the inductive coupling element 306.

As the swipe 375 passes over each inductive coupling element, a corresponding signal is sent from each inductive coupling element to the NFC controller module 212 in the NFC capable device 204. The NFC controller 212 analyzes in relative time the signal sent from each inductive coupling element over which the NFC capable device 202 passes, here elements 302, 304, and 306, to determine that the NFC capable device 202 has moved horizontally across the top row of inductive coupling elements 300.

The vertical swipe depicted in FIGS. 3D-3F operates in similar manner as the horizontal swipe above, only with the swipe passing over elements 304, 310, and 316 in a vertical direction instead.

Illustrative Embodiments of NFC Tag Arrays

Figure 4:
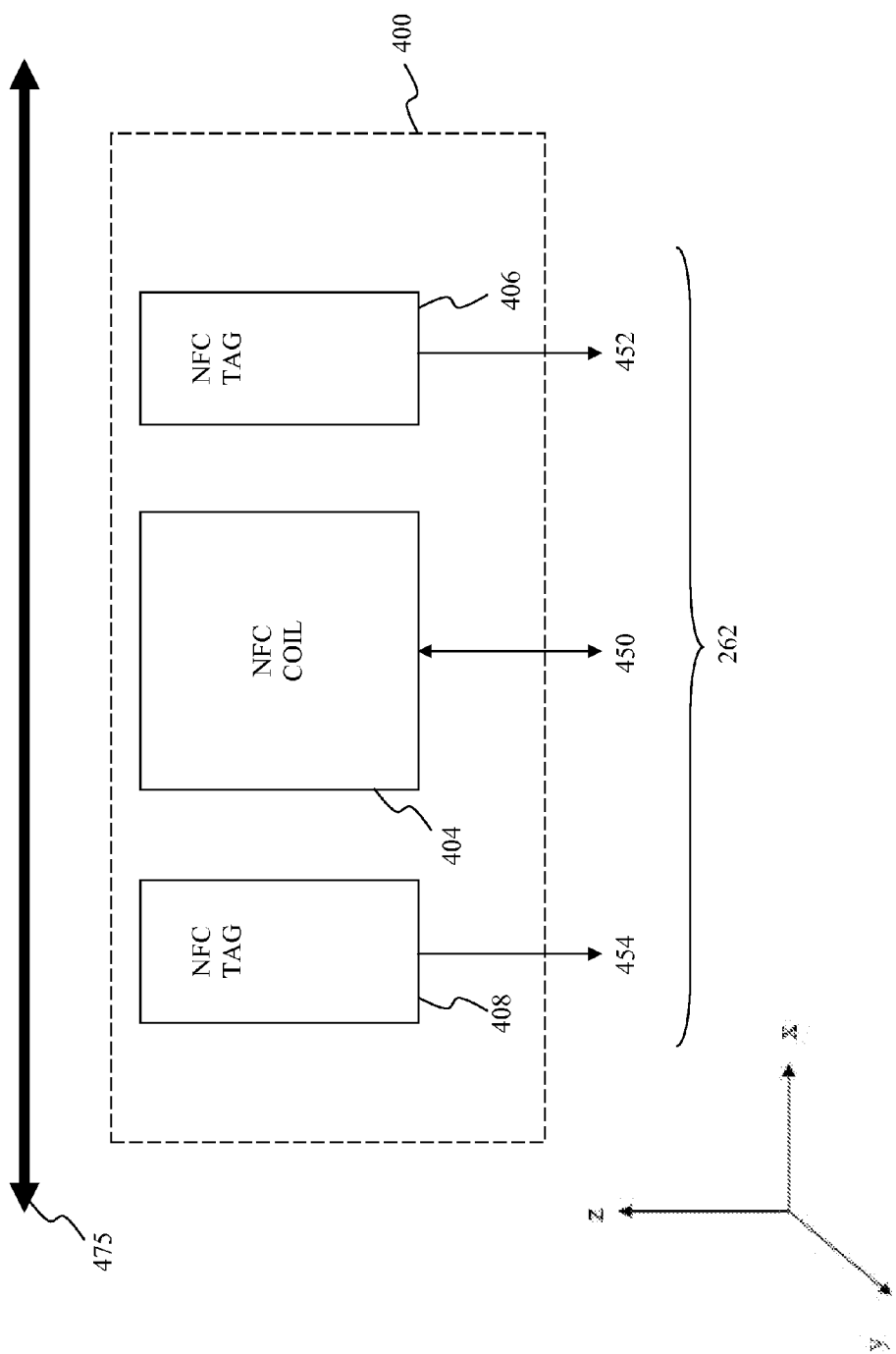
FIG. 4 illustrates a NFC device having a plurality of passive inductive elements according to an embodiment of the present disclosure.

FIG. 4 illustrates a plurality of inductive elements 400 according to an embodiment of the present disclosure. The plurality of inductive elements 400 is one possible embodiment of the antenna module 216 of FIG. 2B. The plurality of inductive elements 400 is configured to operate in a target mode of operation. For example, the plurality of inductive elements 400 may be an NFC tag array 400 and include a NFC coil 404, capable of communicating with another NFC capable device, and NFC tags 406 and 408 that operate as detailed below.

The NFC coil 404 receives a communication signal from another NFC-enabled device, such as the NFC capable device 202. In this embodiment, the NFC capable device 202 is configured to operate as a NFC reader that is capable of generating a magnetic field. A received communications signal is passed from the NFC coil 404 along a shared communications path 450, for example as the observed inbound sequence 258, to the controller module 212 after it has been demodulated by the demodulator module 218. Typically, the received communications signal includes various commands such as a polling command and/or a read command to provide some examples and/or data.

The NFC tags 406 and 408 are depicted by way of example in FIG. 4 as being on either side of the NFC coil 404 along the x-axis of the NFC tag array 400. In this configuration, the NFC tag array 400 is able to detect motion, denoted as swipe 475, of the NFC capable device 202 along a single axis. The NFC tag array 400 could alternatively assume different configurations, such as being on either side of the NFC coil 404 along the z-axis.

The NFC tags 406 and 408 are configured and arranged to be spaced relative to each other, and the NFC coil 404, so that it is less likely that a NFC reader that passes over the NFC tag array 400, for example as swipe 475 from left to right, would cause each NFC tag to detect the generated field from the NFC reader at the same time. This is because the power density of the generated magnetic field from the NFC reader drops off at the rate of $1/R^6$, or the inverse of the range, raised to the sixth power, of the NFC reader from the tags.

In one embodiment, each NFC tag has a tag activation voltage level which, when surpassed, causes the tags to individually assert a general purpose input output signal (GPIO). Depending on the desired sensitivity, activation of the NFC tags 406 and 408 could occur at different tag activation voltage levels as will be apparent to those skilled in the relevant art(s). In FIG. 4, NFC tags 406 and 408 assert GPIO as GPIO signal 452 and GPIO signal 454, respectively, which are received by the controller module 212.

In an exemplary situation the NFC capable device 202 functions as a NFC reader and is swiped from left to right, namely substantially horizontally, across the NFC tag array 400. The swipe 475 is such that the generated magnetic field is within range of the NFC coil 404 and NFC tags 406 and 408. The NFC tags 406 and 408 are geometrically spaced so that the NFC tag 406 will not assert the GPIO signal 452 while the NFC reader is over the NFC tag 408, and subsequently the opposite when the NFC reader is over the NFC tag 406. When the NFC reader is passing over the NFC tag 408 within its near-field region, the NFC tag 408 asserts the GPIO signal 454. As the swipe 475 progresses, the NFC reader leaves the near-field region of the NFC tag 408 and passes over the NFC coil 404, which asserts a GPIO signal that it transmits along the shared communications path 450. The swipe 475 of the NFC reader continues to progress to the right, leaving the near-field region of the NFC coil 404 and passing over the NFC tag 406. When the NFC reader is passing over the NFC tag 406 within its near-field region, the NFC tag 406 asserts the GPIO signal 452. As the swipe leaves the near-field region of each NFC tag/coil, the respective GPIO signal is de-asserted.

Based on these received GPIO signals and the timer, the controller module 212 determines the order in which the GPIO signals were asserted by the NFC tags 406, 408, and NFC coil 404, which indicates the swipe motion. Based on that swipe motion, the controller module 212 compares the indicated swipe motion to a listing of various stored swipe motions previously associated with pre-determined functions and selects the pre-determined function associated with the matching swipe motion, as determined by the controller module 212. The controller module 212 can then initiate the selected pre-determined function associated with the indicated swipe motion.

In another embodiment, the NFC tags 406 and 408 are, instead of simple passive NFC tags, passive NFC coils with envelope detectors. For sake of simplicity, each will still be referred to as NFC tag 406 and NFC tag 408, respectively. In this embodiment, NFC tag 406 and NFC tag 408 would each include a rectifier circuit to provide a rectified voltage to the envelope detector, each of which is not shown in FIG. 4. When a generated magnetic field is within range of the NFC tag 406, the envelope detector of NFC tag 406 passes an analog voltage signal 452 to the controller module 212 that indicates a strength of the received magnetic field. Likewise, when a generated magnetic field is within range of the NFC tag 408, the envelope detector of NFC tag 408 passes an analog voltage signal 454 to the controller module 212 that indicates a strength of the received magnetic field. The NFC coil 404 would also provide an analog voltage signal along the shared communications path 450 when within range or a generated magnetic field. The function is otherwise as discussed above regarding FIGS. 2B and 4.

Figure 5:
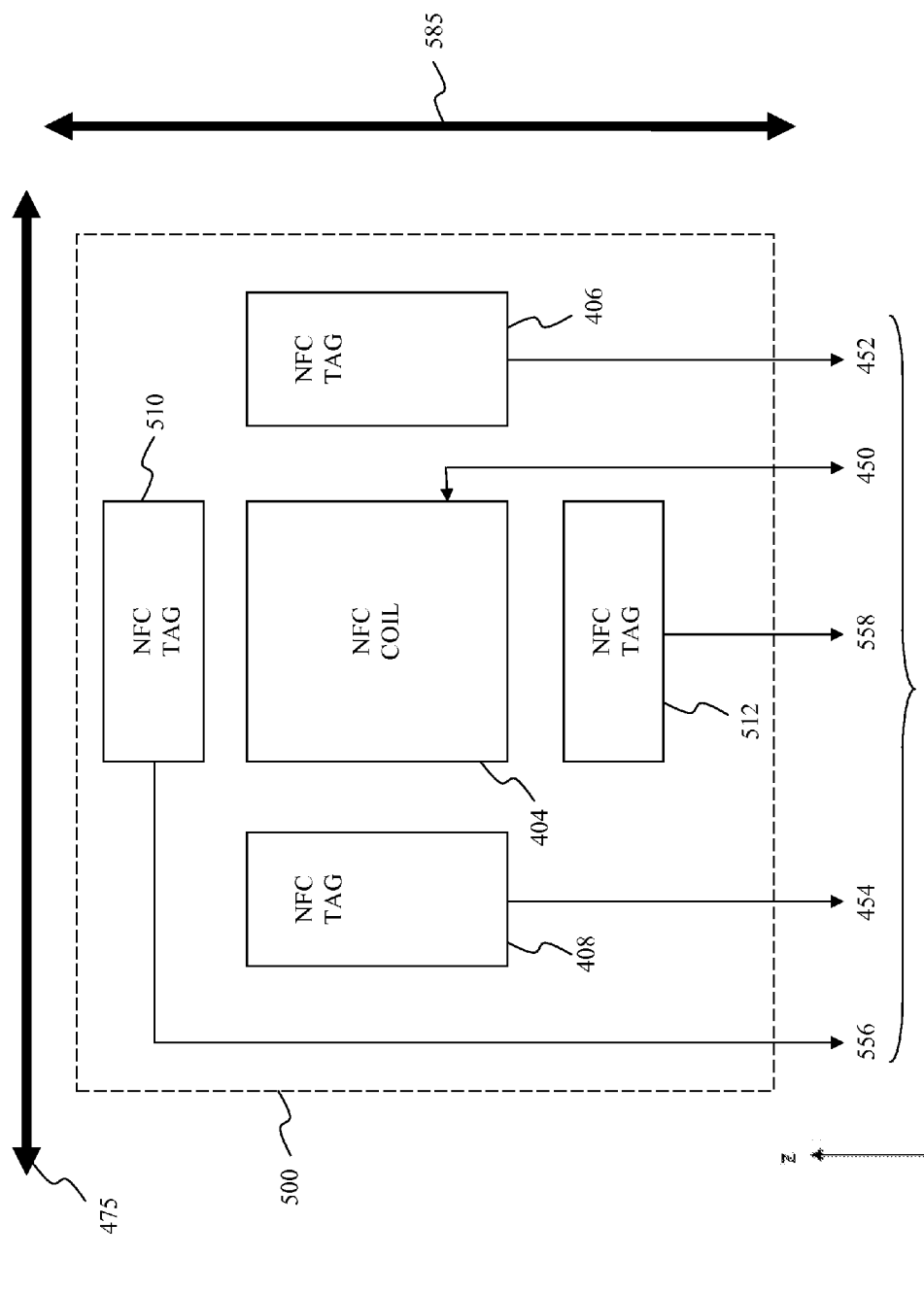
FIG. 5 illustrates a NFC device having a plurality of passive inductive elements according to another embodiment of the present disclosure.

FIG. 5 illustrates a plurality of inductive elements 500 according to another embodiment of the present disclosure. The plurality of inductive elements 500, another possible embodiment of the antenna module 216 of FIG. 2B, shares many substantially similar features as NFC tag array 400 in FIG. 4, but with more NFC tag elements and thus added degrees of freedom. Therefore, only differences between NFC tag array 400 and the plurality of inductive elements 500 will be described in further detail. The plurality of inductive elements 500 may also be, for example, a NFC tag array 500.

The NFC tag array 500 is configured to operate in a target mode of operation. For example, in addition to a swipe motion along the x-axis, such as swipe 475, the NFC-enabled device 500 also permits a swipe 585 along the z-axis according to the axes depicted in FIG. 5. Other swipe directions are enabled with the additional NFC tag elements as will be apparent to those skilled in the relevant art(s).

In addition to the features discussed above with regard to FIG. 4, NFC-enabled device 500 also includes NFC tags 510 and 512 in the tag array. Just as the NFC tags 406 and 408 in FIG. 4, the NFC tags 510 and 512 may either be configured to assert a GPIO signal when the tag activation voltage has been reached, or the tags may be configured to include NFC coils and envelope detectors which output an analog voltage signal. In an embodiment where the NFC tag array outputs GPIO signals, the NFC tags 510 and 512 output the GPIO signals 556 and 558, respectively. In an embodiment where the NFC tag array outputs analog voltage signals, the NFC tags 510 and 512 output the analog voltage signals 556 and 558, respectively. The controller module 212 is further configured to receive the additional GPIO signals/analog voltage signals 556 and 558. The controller module 212 then determines the order of NFC tag GPIO signal assertion/analog voltage signal level change based on all of the signals asserted and a timer in the controller module 212, similar to the operation of the NFC-enabled device 400 in FIG. 4.

The configuration of the NFC tag array 500 allows for diagonal motions as well, e.g. a swipe from the bottom left of the NFC tag array 500 to the top right, or other directions as will be apparent to those skilled in the relevant art(s). For example, the NFC reader may pass close enough to both NFC tags 408 and 512 in the bottom left corner of the NFC tag array 500 that the harvested energy would be sufficient to surpass the tag activation voltage level and assert a GPIO signal for both tags at the same time. Or, in embodiments where the NFC tags include envelope detectors and output analog voltage signals, the NFC tags 408 and 512 output the analog voltage signals at the same time. Additional signals are output by the other NFC tags over which the NFC reader passes.

The controller module 212 receives these signals and compares the indicated swipe motion to a listing of various stored swipe motions previously associated with pre-determined functions. The controller module 212 selects the pre-determined function associated with the matching swipe motion, as determined by the controller module 212. The controller module 212 can then initiate the selected pre-determined function associated with the indicated swipe motion.

Figure 6:
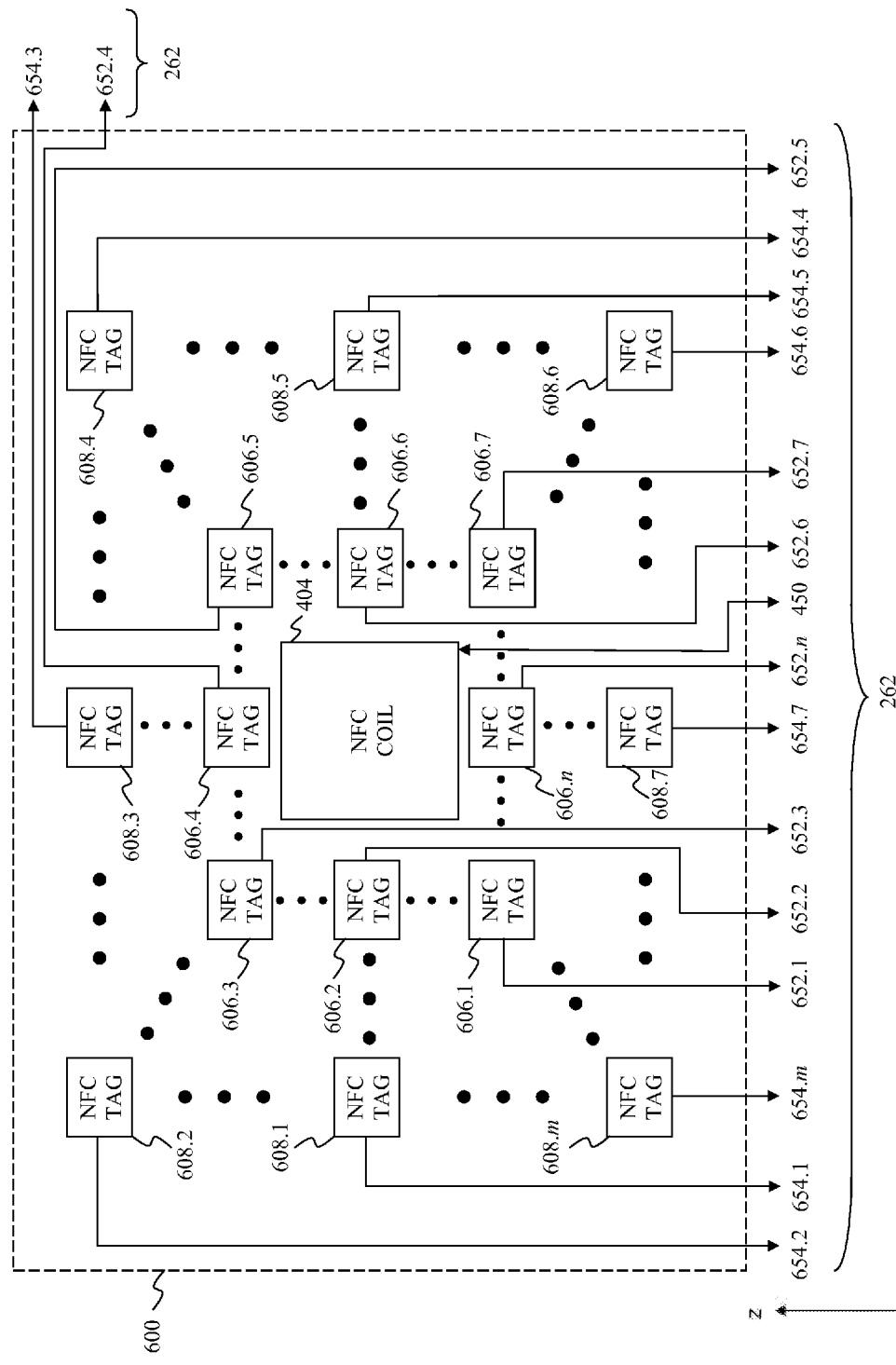
FIG. 6 illustrates a NFC device having a plurality of passive inductive elements according to another embodiment of the present disclosure.

FIG. 6 illustrates a NFC tag array 600 according to another embodiment of the present disclosure. The NFC tag array 600, another possible embodiment of the antenna module 216 of FIG. 2B, is similar to the array 500 in FIG. 5, but again with more NFC tag elements and thus added degrees of freedom for swiping dimensions. The NFC tag array 600 is also configured to operate in a target mode of operation. The additional swipe directions thus enabled with the additional NFC tag elements as depicted in FIG. 6 will be apparent to those skilled in the relevant art(s). For example, it is not necessary for a NFC reader to begin a swipe at the outer periphery of any side of the NFC tag array 600. Instead, the controller module 212 is configured to determine a swipe direction, or plurality of directions for a single swipe, based on the signals it receives for the duration that a NFC reader's magnetic field is within range of the NFC tag elements in the NFC tag array 600. This greatly increases the degrees of freedom possible for swipes within the field of the NFC tag array 600, given the increased resolution of the NFC tag array 600.

Illustrative Embodiments of NFC Reader Arrays

Figure 7:
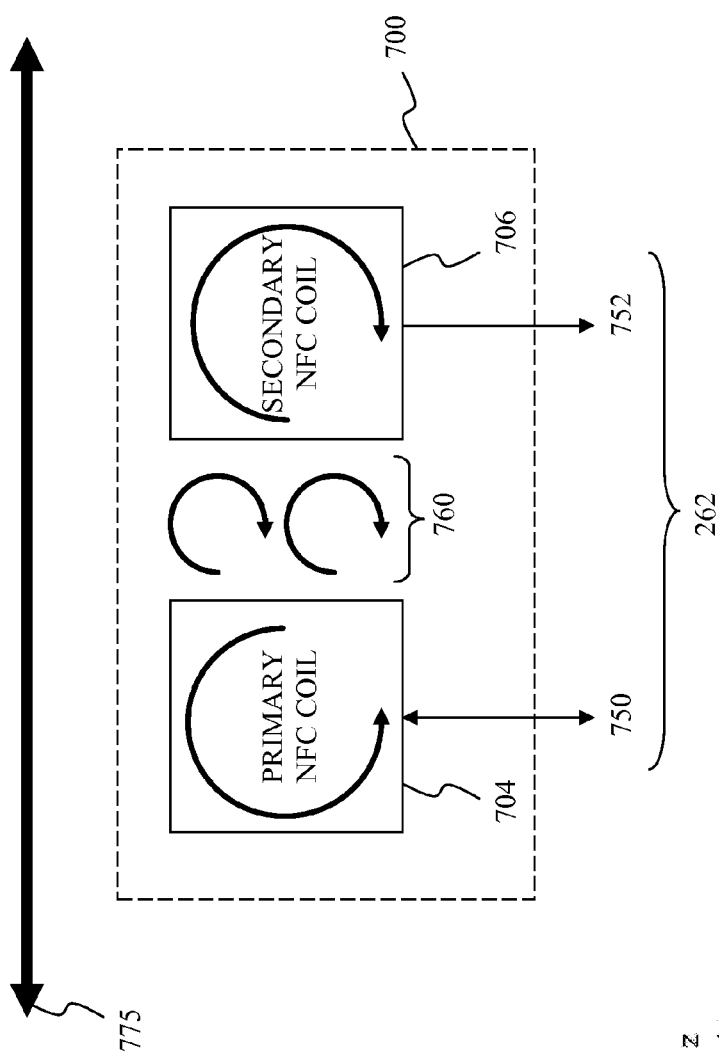
FIG. 7 illustrates a NFC reader having a plurality of inductive elements according to an embodiment of the present disclosure.
Figure 7:
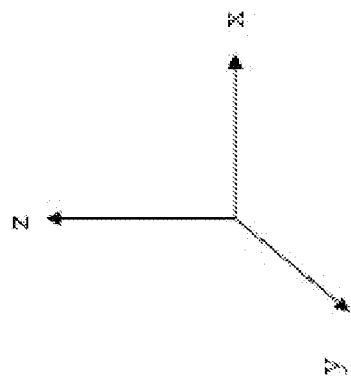

FIG. 7 illustrates a NFC reader arrangement 700 according to an embodiment of the present disclosure. NFC reader arrangement 700, another possible embodiment of the antenna module 216 of FIG. 2B, is configured to operate in an initiator mode of operation. In one example, the NFC device 210 is a NFC reader. For example, the NFC device may be the NFC capable device 204 of FIG. 2A. In this embodiment, the NFC reader arrangement 700 includes a plurality of inductive elements, for example arranged in an array, and a swipe or gesture is provided by a NFC target or tag, not shown in FIG. 7, that passes through the NFC reader arrangement 700's generated magnetic field. This arrangement may be referred to as a reader array. The NFC tag may be, for example, the NFC capable device 202 of FIG. 2A.

A primary NFC coil 704 is used to transmit and receive data from other NFC-enabled devices, such as the NFC tag. In one embodiment, in addition to data reception and transmission, the primary NFC coil 704 receives a first current along data pathway 750 from the controller module 212. The first current generates a magnetic field 760. The magnetic field 760 induces a second current in the adjacent secondary NFC coil 706.

In this embodiment, the primary NFC coil 704 and secondary NFC coil 706 each include an envelope detector. The envelope detector detects changes in the current in each NFC coil. The output of the envelope detector of the primary NFC coil 704 is an analog voltage signal representing the amount of current in the NFC coil. This analog voltage signal is sent via the data pathway 750 to the controller module 212 along the bidirectional communication path 264. The output of the envelope detector of the secondary NFC coil 706 is analog voltage signal 752, which represents the amount of induced current in the secondary NFC coil 706. This is also sent to the controller module 212 via the bidirectional communication path 264.

The configuration and number of the plurality of inductive elements, here shown as NFC coils, dictates how many directions (degrees of freedom) a swipe, such as swipe 775, may have and still be detected. In this embodiment, there are two inductive elements arranged along the x-axis (horizontal axis) of the NFC reader arrangement 700. In this configuration, the NFC-enabled device 700 will only recognize swipe 775 as being in the horizontal axis. Later embodiments will depict devices with more inductive elements in configurations that allow more directions for swipes. FIGS. 3A-3F above discuss exemplary swipes possible in the present disclosure.

Swiping a second NFC-enabled device, such as an NFC tag, along an enabled axis of the NFC-enabled device 700 places a load on each NFC coil when the NFC tag passes over while within range of the generated magnetic field of the NFC reader arrangement 700. In one example, the swipe 775 is from left to right across the NFC reader arrangement 700. The NFC tag first passes over the primary NFC coil 704. While the NFC tag is within the generated magnetic field of the primary NFC coil 704 as the coil receives current from the NFC controller 702, the NFC tag places a load on the primary NFC coil 704. This changes the current in the primary NFC coil 704, which changes the analog voltage signal output of the envelope detector. The changes in the analog voltage signal output are sent via the data pathway 750 along the bidirectional communication path 264 to the controller module 212. As the swipe 775 progresses, the NFC tag leaves the near-field region of the primary NFC coil 704 and passes over the secondary NFC coil 706. The NFC tag places a load on the secondary NFC coil 706, which changes the analog voltage signal 752 output from the envelope detector associated with the NFC secondary coil 706.

The controller module 212 receives the changes of both analog voltage signals. The controller module 212 determines the order in which the analog voltage signals were output by the NFC coils, which indicates the swipe direction, based on the received analog voltage signals and the controller's timer. The controller module 212 receives these signals and compares the indicated swipe motion to a listing of various stored swipe motions previously associated with pre-determined functions. The controller module 212 selects the pre-determined function associated with the matching swipe motion, as determined by the controller module 212. The controller module 212 can then initiate the selected pre-determined function associated with the indicated swipe motion.

In an alternative embodiment, the secondary NFC coil 706 may receive current directly from the controller module 212, just as the primary NFC coil 704. This would increase the signal strength of the analog voltage signal 752. It would be more robust because there would not be a reliance on measuring induced current only in the secondary NFC coil 706. The NFC coils could be placed farther apart, effectively covering larger areas with the plurality of NFC coils. The spacing of the NFC coils would help alleviate any potential signal interference between the primary NFC coil 704 and the secondary NFC coil 706. In addition, the controller module 212 may be configured to control how the current is transferred to each NFC coil to help avoid signal interference. Such configurations would consume more current than the counterpart which supplies current to the primary NFC coil 704 only and relies on inducing current in neighboring secondary coils. In this alternative embodiment, the operation would be the same except that the envelope detector coupled to each NFC coil would directly measure the load placed on the NFC coil by the second NFC-enabled device, such as an NFC tag.

Figure 8:
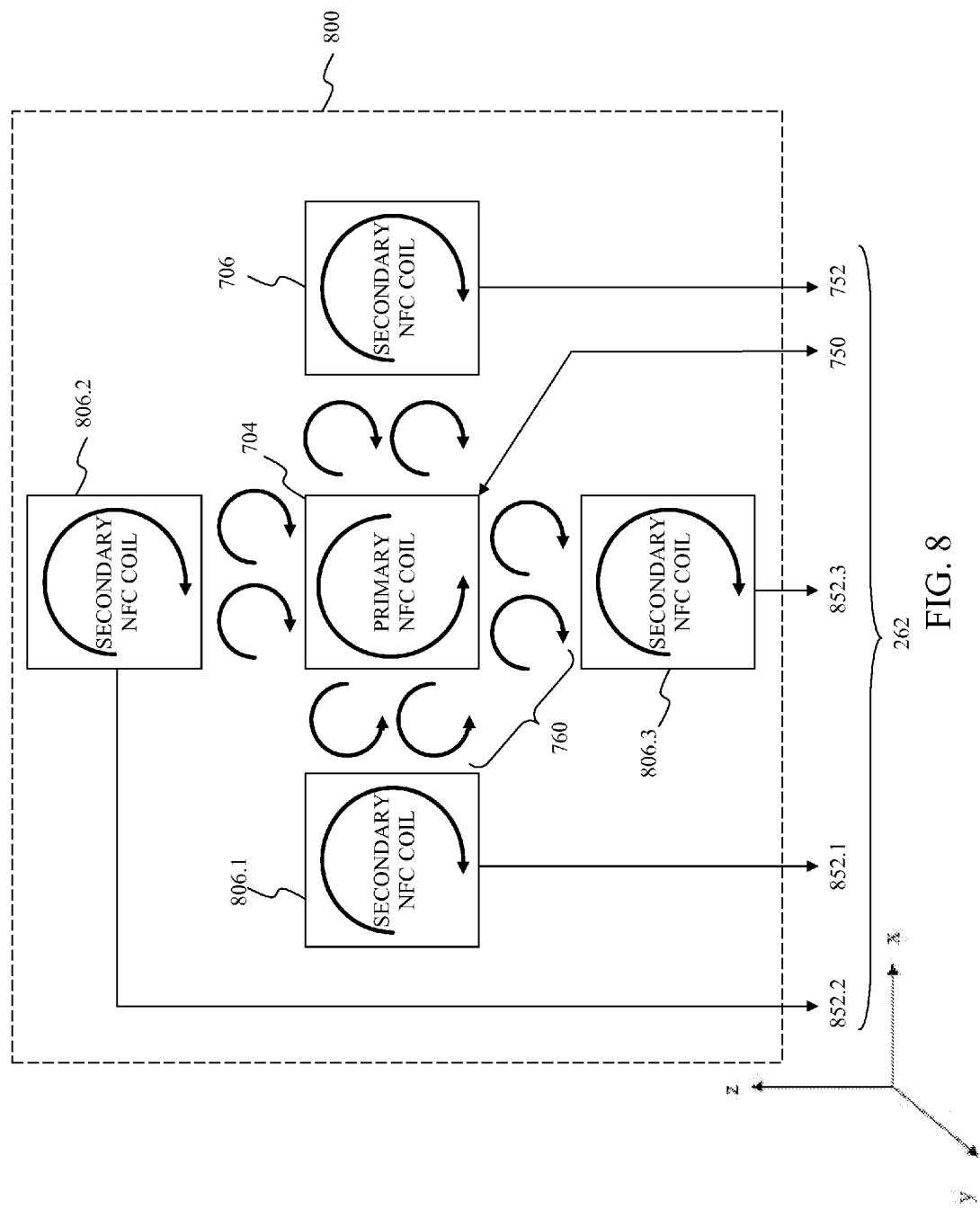
FIG. 8 illustrates a NFC reader having a plurality of inductive elements according to another embodiment of the present disclosure.

FIG. 8 illustrates a NFC reader arrangement 800 according to another embodiment of the present disclosure. NFC reader arrangement 800, another possible embodiment of the antenna module 216 of FIG. 2B, is similar to the arrangement 700 in FIG. 7, but with more inductive coupling elements, such as secondary NFC coils, and thus added degrees of freedom for swiping dimensions. The NFC reader arrangement 800 is therefore also configured to operate in an initiator mode of operation. For example, in addition to a swipe motion along the x-axis, the NFC-enabled device 800 also permits a swipe along the z-axis according to the axes depicted in FIG. 8. Other swipe directions are enabled with the additional NFC coils as will be apparent to those skilled in the relevant art(s).

In addition to the features discussed above with regard to FIG. 7, NFC reader arrangement 800 includes more secondary NFC coils, depicted in FIG. 8 as secondary NFC coils 806.1 through 806.3. In FIG. 8, the secondary NFC coils 806.1 through 806.3 are arranged in an array surrounding the primary NFC coil 704. Just as the secondary NFC coil 706, the secondary NFC coils 806.1 through 806.3 may either be configured to have current induced by the magnetic field 760 from the primary NFC coil 704, or receive current directly from the controller module 212.

The configuration of the NFC reader arrangement 800 allows for diagonal motions as well, e.g. a swipe from the bottom left of the arrangement 800 to the top right, or other directions as will be apparent to those skilled in the relevant art(s). For example, the NFC tag may pass close enough to both secondary coils 806.1 and 806.3 in the bottom left corner of the arrangement 800 that both NFC coils detect the presence of the NFC tag in their fields at the same time. Additional signals are output by the other NFC coils over which the NFC tag passes.

The controller module 212 receives these signals and compares the indicated swipe motion to a listing of various stored swipe motions previously associated with pre-determined functions. The controller module 212 selects the pre-determined function associated with the matching swipe motion, as determined by the controller module 212. The controller module 212 can then initiate the selected pre-determined function associated with the indicated swipe motion.

Figure 9A:
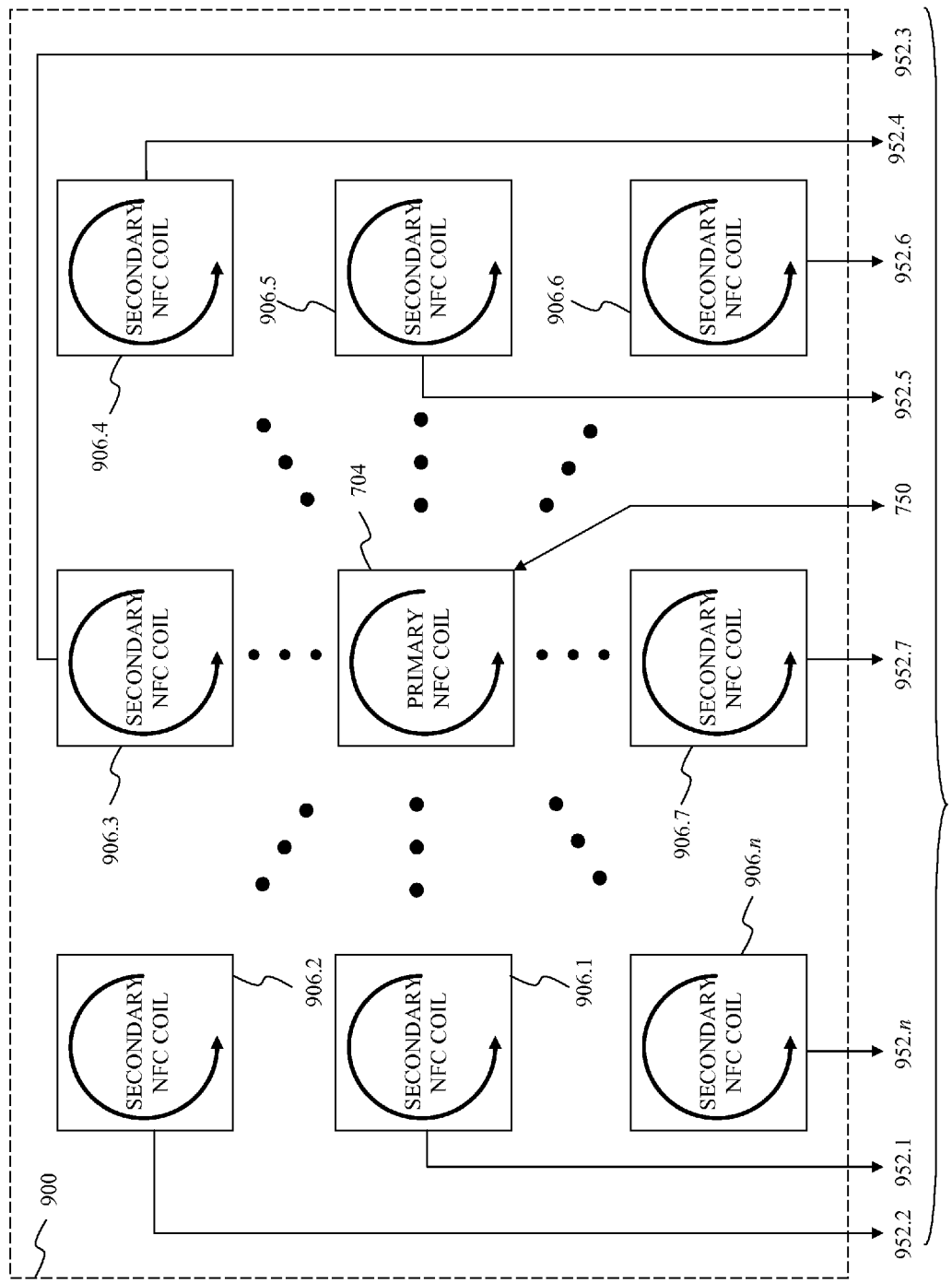
FIG. 9A illustrates a NFC reader having a plurality of inductive elements according to another embodiment of the present disclosure.

FIG. 9A illustrates a NFC reader arrangement 900 according to another embodiment of the present disclosure. The NFC reader arrangement 900 is similar to the arrangement 800 in FIG. 8, but again with more inductive elements, for example secondary NFC coils, and thus added degrees of freedom for swiping dimensions. The NFC reader arrangement 900 is also configured to operate in an initiator mode of operation. The additional swipe directions thus enabled with the additional secondary NFC coils depicted in FIG. 9A will be apparent to those skilled in the relevant art(s).

NFC-enabled device 900 includes secondary NFC coils 906.1 through 906.n directly surrounding the primary NFC coil 704, as well as throughout the rest of the NFC reader arrangement 900. The secondary NFC coils 906.1 through 906.n may be placed in various geometric configurations, such as in columns and rows. In FIG. 9, the secondary NFC coils 906.1 through 906.n are arranged in an array surrounding the primary NFC coil 704. Just as the secondary NFC coils 806.1 through 806.3 in FIG. 8, the secondary NFC coils 906.1 through 906.n may either be configured to have current induced from the primary NFC coil 704, or receive current directly from the controller module 212.

In an embodiment where the secondary NFC coils 906.1 through 906.n are configured to have current induced from the primary NFC coil 704, the number of secondary NFC coils 906.n possible will depend on how much current is supplied to the primary NFC coil 704, and how much current is induced in each subsequent column and/or row ranging out from the primary NFC coil 704. It will be apparent to those skilled in the relevant art(s) that the number of additional secondary NFC coils 906.n possible in the reader arrangement may be calculated based on the supplied current to the primary NFC coil 704 and the efficiency of the secondary NFC coils 906.n in generating an induced current based on the supplied current.

In another embodiment the NFC coils 906.1 through 906.n are configured to directly receive current from the controller module 212. Otherwise the operation is the same as directly detailed above, except that this embodiment would not be subject to the same design consideration, since each additional NFC coil 906.n would not have to rely on an induced current from another NFC coil in the arrangement, which in turn relies on the supplied current to the primary NFC coil 704.

In the embodiment described in FIG. 9A, it is not necessary for a NFC reader to begin a swipe at the outer periphery of any side of the NFC reader arrangement 900. Instead, the controller module 212 is configured to determine a swipe direction, or plurality of directions for a single swipe, based on the signals it receives for the duration that a NFC tag is within range of the NFC reader arrangement 900's magnetic field. This greatly increases the degrees of freedom possible for swipes within the field of the NFC reader arrangement 900.

Figure 9B:
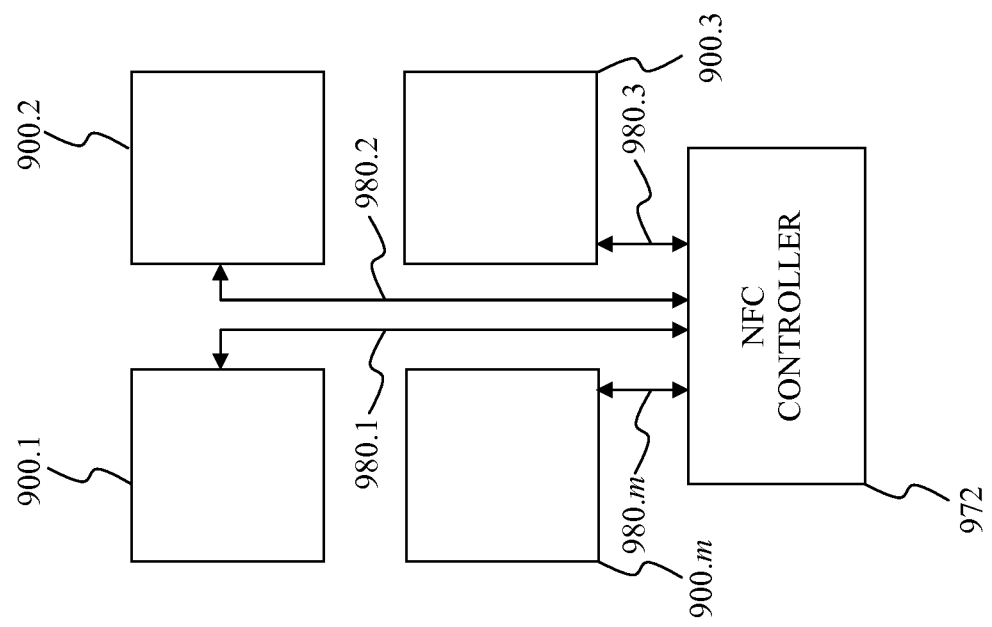
FIG. 9B illustrates an application of the NFC reader having a plurality of inductive elements, according to an embodiment of the present disclosure.

FIG. 9B illustrates an application of the NFC reader arrangement 900 of FIG. 9A, according to an embodiment of the present disclosure. In this embodiment, the NFC controller 972, for example controller module 212, may be connected to a plurality of NFC reader arrangements 900, each including arrays of individual NFC inductive elements 906.1 through 906.n with attending signal outputs 982.1 through 982.n to the NFC controller 972. In such configurations, each NFC reader arrangement 900.1 through 900.m, where a plurality of them are deployed, includes a data and power bus 980.1 through 980.m, respectively.

Each NFC reader array 900.1 through 900.m may include a primary NFC coil 704 and a plurality of secondary NFC inductive elements 906.1 through 906.n that receive an induced current from a current supplied by the NFC controller 972 to the primary NFC coil 704. Or, in the alternative, each primary NFC coil 704 and each secondary NFC coil 906.1 through 906.n may receive a current directly from the NFC controller 972. As will be apparent to those skilled in the relevant art(s), each NFC reader array 900.1 through 900.m could have as many, or as few, NFC inductive elements, as desired and subject to the design constraints of the particular application.

Additional Illustrative Embodiments

Figure 10:
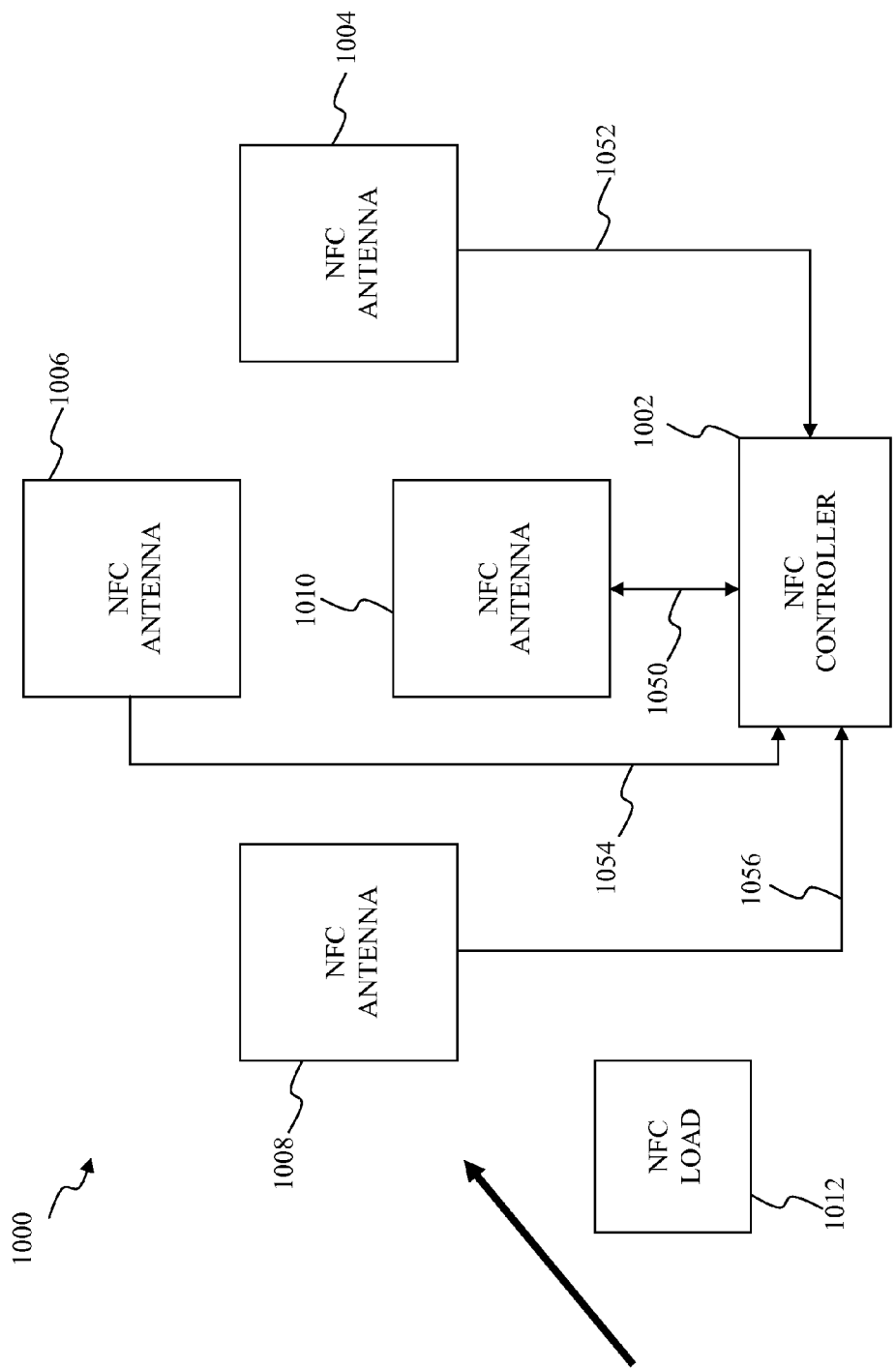
FIG. 10 illustrates a NFC reader constellation according to an embodiment of the present disclosure.

FIG. 10 illustrates a NFC reader constellation 1000 according to an embodiment of the present disclosure. This embodiment expands on the embodiments discussed above regarding FIGS. 7-8 and 9A-9B, in that each NFC antenna 1004 through 1010 is individually powered from the NFC controller 1002. In this embodiment, each NFC antenna 1004 through 1010 may be a single NFC antenna. Or, in the alternative, like FIG. 9B above each NFC antenna 1004 through 1010 may include a plurality of secondary NFC coils, such as NFC reader arrangements 700, 800, or 900 to provide some examples, each being directly powered by the NFC controller 1002. Each NFC antenna 1004 through 1010 is independent from the others and may have any shape or size appropriate for NFC communication.

The NFC antennas 1004 through 1010 may be configured and arranged to form a constellation of various configurations, such as a star, square, triangle, or others as will be apparent to those skilled in the relevant art(s). Though FIG. 10 depicts four NFC antennas 1004 through 1010, there may be more or fewer, depending on design preferences and requirements. Since each NFC antenna in the reader constellation 1000 is directly powered by the NFC controller 1002, the reader constellation 1000 may be deployed over a greater area than the embodiments discussed above. Typically, the constellation area will still be small enough to be in reasonable range of a person with an NFC-enabled device, such as a tag on a key fob or smart card, to complete swipes in various patterns. Or, there may be multiple NFC antennas placed in a constellation on a tablet or portable computer.

Each of the NFC antennas 1004 through 1010 are connected to the NFC controller 1002 via signal busses 1050 through 1056. The NFC controller 1002 may be a single controller designed and configured to control each NFC antenna 1004 through 1010, or a plurality of controllers, e.g., a controller associated with each NFC antenna. In embodiments where the NFC controller 1002 includes a plurality of controllers, the plurality of controllers are interconnected via signal lines to each other. In this manner, the plurality of controllers may still coordinate so that their respective NFC antenna does not interfere with the transmission of any other NFC antenna in the reader constellation 1000. In certain embodiments, each NFC antenna 1004 through 1010 is capable of communicating with NFC-enabled devices that pass within range of their magnetic field.

The NFC controller 1002 may power each NFC antenna 1004 through 1010 simultaneously. In the alternative, the NFC controller 1002 may quickly switch through powering each NFC antenna individually, for example cycling through by first powering the NFC antenna 1004, then the NFC antenna 1006, then the NFC antenna 1008, and then the NFC antenna 1010. Upon completion of the cycle, the NFC controller 1002 may begin the cycle again with the NFC antenna 1004. For example, each NFC antenna may receive power for a short duration in the range of milliseconds at a time.

In operation, a NFC load 1012 begins a swipe through the field of one of the NFC antennas 1004 through 1010. As indicated above, the NFC load 1012 could be a type of NFC tag, such as a key fob or smart card (or another NFC reader in a peer-to-peer application). As will be apparent to those skilled in the relevant art(s), other types of NFC loads are possible. In one example, the NFC load 1012 begins a swipe within range of the NFC antenna 1008. Similar to the operation of the NFC reader arrays in FIGS. 7-8 and 9A-9B, each NFC antenna from among the NFC antennas 1004 through 1010 includes envelope detection or other hardware to directly measure an amount of energy change caused by the NFC load 1012 passing within the NFC antenna's field. The change in energy caused by the NFC load 1012 in the NFC antenna 1008's field is sent as a signal to the NFC controller 1002 via the signal bus 1056. This could either be a digital signal that indicates the presence or absence of the NFC load 1012 within the NFC antenna 1008's field, or an analog voltage signal that is converted at the NFC controller 1002 as discussed in the various embodiments above.

As the swipe of the NFC load 1012 continues through the reader constellation 1000, the NFC load 1012 may next pass through the NFC antenna 1006's field. The change in energy caused by the NFC load 1012 in the NFC antenna 1006's field is sent as a signal to the NFC controller 1002 via the signal bus 1054. The swipe may continue to pass through the field of another NFC antenna in the constellation 1000, including an NFC antenna that has already been passed over, before the swipe completes.

There may be a gap of space and time between the NFC load 1012 passing through the first NFC antenna's field and any subsequent NFC antenna's field in the reader constellation 1000. The NFC controller 1002 may compensate for this by having a timeout period after receiving a signal from one or more of the NFC antennas 1004 through 1010 indicating detection of the NFC load 1012 within its field. After such a timeout period, if only one NFC antenna from among the NFC antennas 1004 through 1010 had detected the NFC load 1012, the NFC controller 1002 may abort determination of swipe direction.

Once the NFC controller 1002 determines that the swipe is complete, the NFC controller 1002 then determines the order of signal output based on all of the signals received and a timer in the NFC controller 1002, similar to the operation of the NFC-enabled devices in previous embodiments. The determination of order indicates the swipe motion of the NFC load 1012 through the reader constellation 1000. The NFC controller 1002 compares the indicated swipe motion to a listing of various stored swipe motions previously associated with pre-determined functions. The NFC controller 1002 selects the pre-determined function associated with the matching swipe motion, as determined by the NFC controller 1002. The NFC controller 1002 can then initiate the selected pre-determined function associated with the indicated swipe motion.

Figure 11:
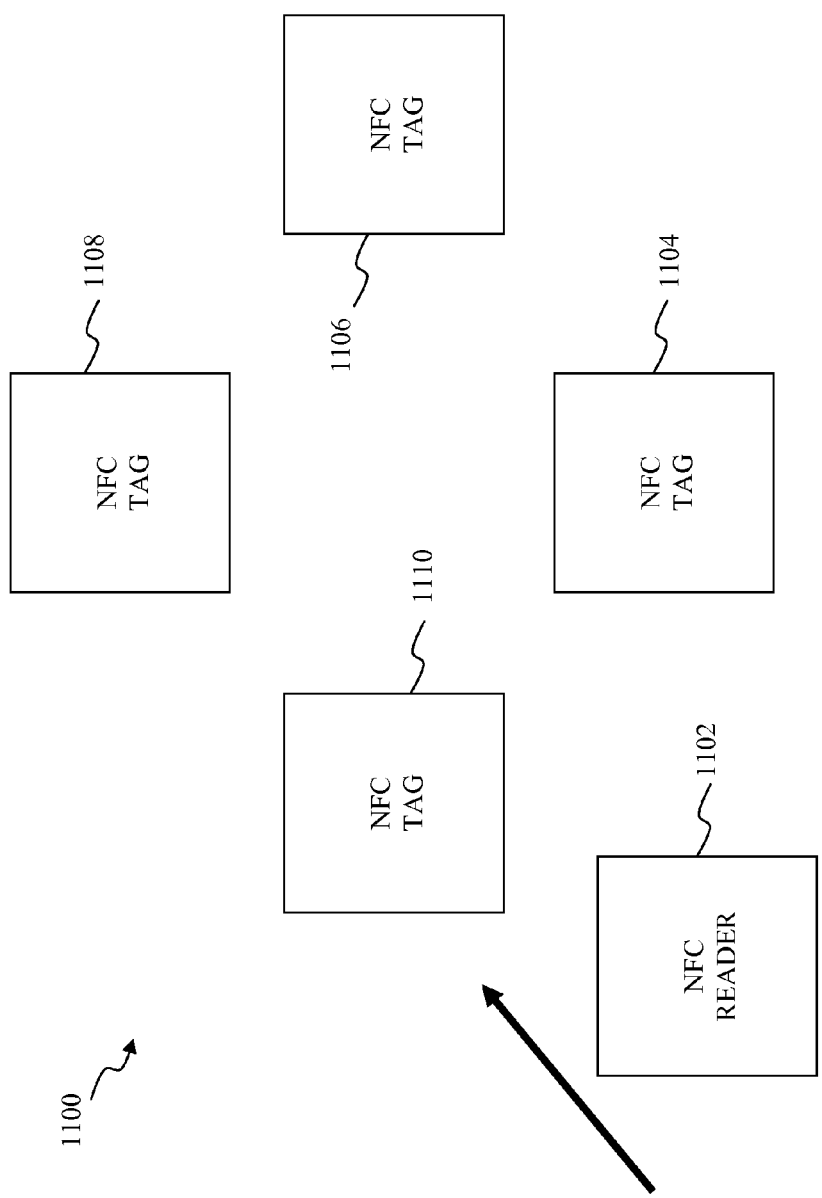
FIG. 11 illustrates a NFC tag constellation according to an embodiment of the present disclosure.

FIG. 11 illustrates a NFC tag constellation 1100 according to an embodiment of the present disclosure. This embodiment is an alternative to the embodiments discussed above regarding FIGS. 4-6, in that each NFC tag 1104 through 1106 is individually situated apart from each other. In this embodiment, each NFC tag 1104 through 1106 may be a single NFC tag. Or, in the alternative, as indicated in FIG. 6 above, each NFC tag 1104 through 1106 may include an array of NFC tags. Each NFC tag 1104 through 1106 is independent from the others and may have any shape or size appropriate for NFC communication.

The NFC tags 1104 through 1106 may be arrayed in a constellation of various configurations, such as a star, square, triangle, or others as will be apparent to those skilled in the relevant art(s). Though FIG. 11 depicts four NFC tags 1104 through 1106, there may be more or fewer, depending on design preferences and requirements. Since each NFC tag in the tag constellation 1100 is independent from the others, the tag constellation 1100 may be deployed over a greater area than the embodiments discussed above. Typically, the constellation area will still be small enough to be in reasonable range of a person with an NFC-enabled device, such as a reader on a mobile phone, to complete swipes in various patterns. For example, the tag constellation could be placed around a doorway.

Each of the NFC tag 1104 through 1106 may have its own controller. Each may have a configuration, for example, as discussed regarding NFC capable device 210 in FIG. 2B above in the target mode of operation. In certain embodiments, each NFC tag 1104 through 1106 is capable of communicating with NFC-enabled devices that generate magnetic fields of compatible type and pass within range of the NFC tags 1104 through 1106.

Each NFC tag 1104 through 1106 may be a passive tag only which harvests energy from NFC-enabled devices in the initiator mode of operation when they are within range of each other. In the alternative, each NFC tag 1104 through 1106, or some of them, may have their own power sources as well as power harvesting capability.

In operation, a NFC-enabled device capable of initiator mode of operation, depicted as NFC reader 1102 in FIG. 11, begins a swipe through the field of one of the NFC tags 1104 through 1106. In one example, the NFC reader 1102 begins a swipe within range of the NFC tag 1110. As the NFC reader 1102 passes over the NFC tag 1110, the NFC reader 1102 passes slowly enough that the contents of a memory in the NFC tag 1110 may be read. The contents of the memory identifies the NFC tag 1110 to the NFC reader 1102.

As the swipe of the NFC reader 1102 continues through the tag constellation 1100, the NFC reader 1102 may next pass through the NFC tag 1108's field. Once again, the NFC reader 1102 passes slowly enough that the contents of a memory in the NFC tag 1108 may be read. The contents of the memory identifies the NFC tag 1108 to the NFC reader 1102. The swipe may continue to pass through the field of another NFC tag in the constellation 1100, including an NFC tag that has already been passed over, before the swipe completes.

There may be a gap of space and time between the NFC reader 1102 passing through the first NFC tag's field and any subsequent NFC tag's field in the tag constellation 1100. A controller associated with the NFC reader 1102 may compensate for this by having a timeout period after reading the contents from one or more of the NFC tags 1104 through 1110. After such a timeout period, if only the identifying memory contents of one NFC tag from among the NFC tags 1104 through 1110 had been read by the NFC reader 1102, the controller may abort determination of a swipe direction. If the identifying memory contents of two or more NFC tags from among the NFC tags 1104 through 1110 had been read by the NFC reader 1102, the controller may then proceed with determining a swipe of the NFC reader 1102.

The NFC reader's controller determines the order in which the NFC tags were read during the swipe. The determination of order indicates the swipe motion of the NFC reader 1102 through the tag constellation 1100. The NFC reader's controller compares the indicated swipe motion to a listing of various stored swipe motions previously associated with pre-determined functions. The NFC reader's controller selects the pre-determined function associated with the matching swipe motion, as determined by the NFC reader's controller. The NFC reader's controller can then initiate the selected pre-determined function associated with the indicated swipe motion. Alternatively, the NFC reader 1102 may assume a direction of the swipe based on the identifying contents of the first NFC tag 1110.

In addition to the embodiments discussed above, an embodiment is possible where a swipe is measured by an accelerometer. For example, the NFC capable device 202 in FIG. 2A may be a mobile phone, tablet, or other device that includes both NFC capability and an accelerometer. In one exemplary embodiment, the NFC capable device 202 may operate in the target mode of operation only. In this configuration, one or more NFC tags associated with the NFC capable device 202 sense the presence of a generated magnetic field, such as one generated by the NFC capable device 204 in FIG. 2A by a NFC reader or NFC communicator in the initiator mode of operation.

The NFC capable device 202 wakes up the accelerometer when the presence of the magnetic field is detected. The accelerometer measures the swipe motion(s) of the NFC capable device 202 once activated. This motion(s) determines the context of a transaction at the NFC capable device 202 while within range of the NFC capable device 204. The accelerometer may be connected to a controller within the NFC capable device 202, or a controller within the NFC device itself, or both, and may provide the motion information to the controller(s). The motion is decoded within the NFC capable device 202 by the controller(s). Based on the decoded motion and the data received from the NFC capable device 204, or the decoded motion alone, the pre-determined function associated with the particular motion(s) or motion(s) and data is initiated. The decoded motion may alternatively or additionally be sent to the NFC capable device 204, or the recorded motion(s) of the NFC capable device 202 may be sent to the NFC capable device 204 for decoding, to initiate a pre-determined function in the NFC capable device 204.

Alternatively, the NFC capable device 202 may operate in the initiator mode of operation. In this configuration, the NFC capable device 202 would sense the presence of a generated magnetic field, such as one generated by the NFC capable device 204 of FIG. 2 either as a NFC reader or NFC communicator in the initiator mode of operation. The NFC capable device 202 and the NFC capable device 204 would operate in a peer-to-peer configuration to avoid transmission collisions. The operation then continues as indicated above, with the NFC capable device 202 waking up the accelerometer upon detection of the magnetic field. In this manner, power is conserved because the accelerometer does not have to be constantly on. The accelerometer determines the motion(s) of the NFC capable device 202 once active and decodes this motion at the NFC capable device 202. Based on the decoded motion and the data received from the NFC capable device 204, or the decoded motion alone, the pre-determined function associated with the particular motion(s) or motion(s) and data is initiated. In addition or in the alternative, the NFC capable device 202 may send the decoded information to the NFC capable device 204, or send the motion information to the NFC capable device 204 for decoding, to initiate a pre-determined function in the NFC capable device 204.

Exemplary Methods

Figure 12:
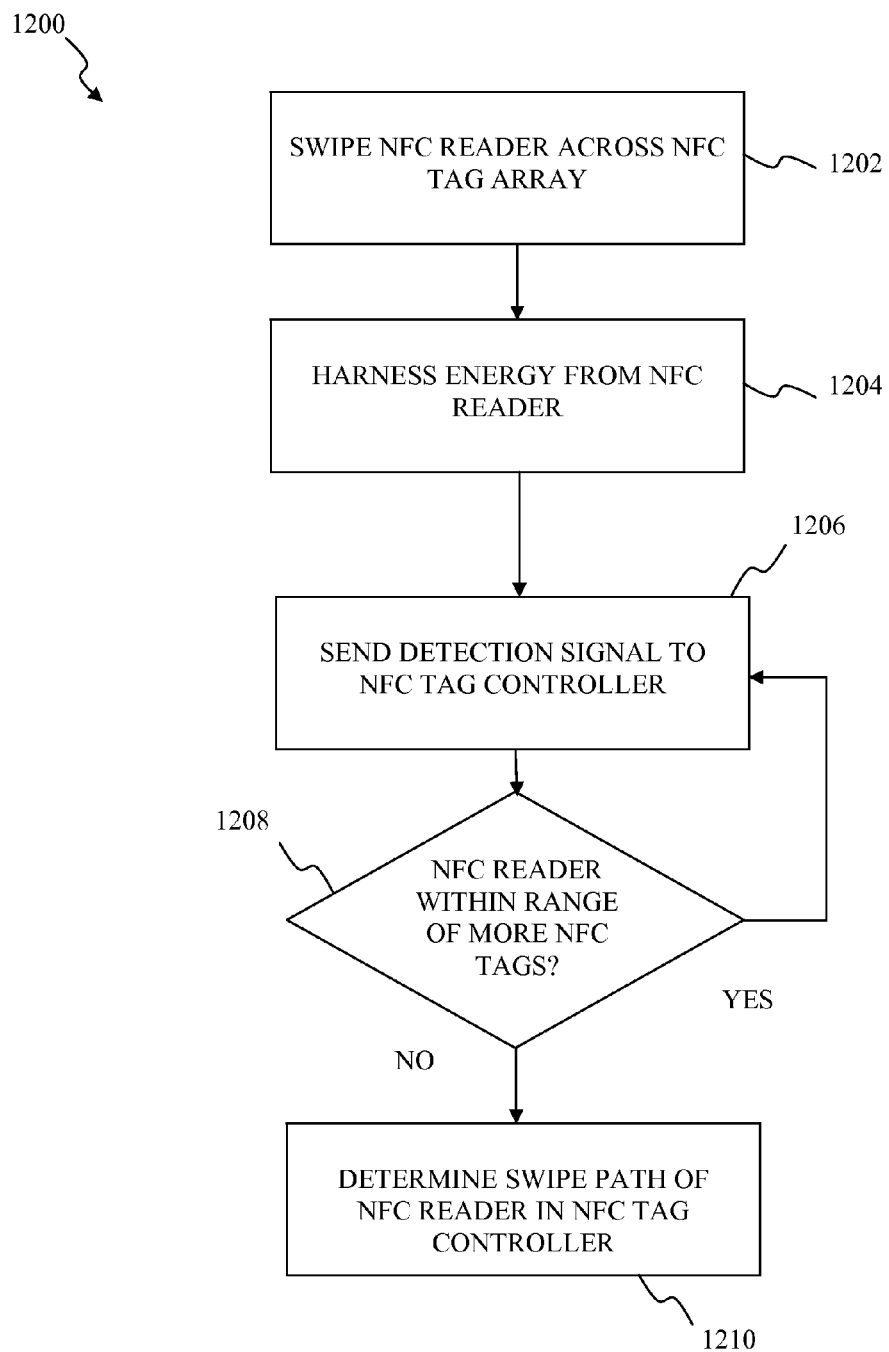
FIG. 12 is a flowchart of exemplary operational steps for context determination in a NFC tag array, according to an exemplary embodiment of the present disclosure.

FIG. 12 is a flowchart of exemplary operational steps for context determination, according to an exemplary embodiment of the present disclosure.

Method 1200 begins with step 1202. At step 1202, a NFC reader, or another type of NFC device capable of the initiator mode of operation, is swiped across a plurality of NFC tags, or another type of NFC device capable of the target mode of operation, such as an NFC tag array. An exemplary device for the NFC device having a plurality of NFC tags could be the NFC-enabled device 204 in the target mode of operation, for example. An exemplary device for the NFC reader could be NFC capable device 202 in the initiator mode of operation, for example.

At step 1204, each NFC tag in the NFC tag array over which the NFC reader passes harvests energy from the NFC reader while within range.

At step 1206, each NFC tag in the NFC tag array over which the NFC reader passes sends a detection signal to the NFC controller once sufficient energy has been harvested from the NFC reader.

At step 1208, a determination is made whether the NFC reader is passing within range of any more NFC tags within the NFC tag array. There are several ways to accomplish this, as will be apparent to those skilled in the relevant art(s).

At step 1210, the swipe path of the NFC reader through the NFC tag array is determined because the NFC reader is not within range of any more NFC tags of the NFC tag array. This may be done, for example, by a NFC controller in the NFC device capable of the target mode of operation that has the NFC tag array.

Figure 13:
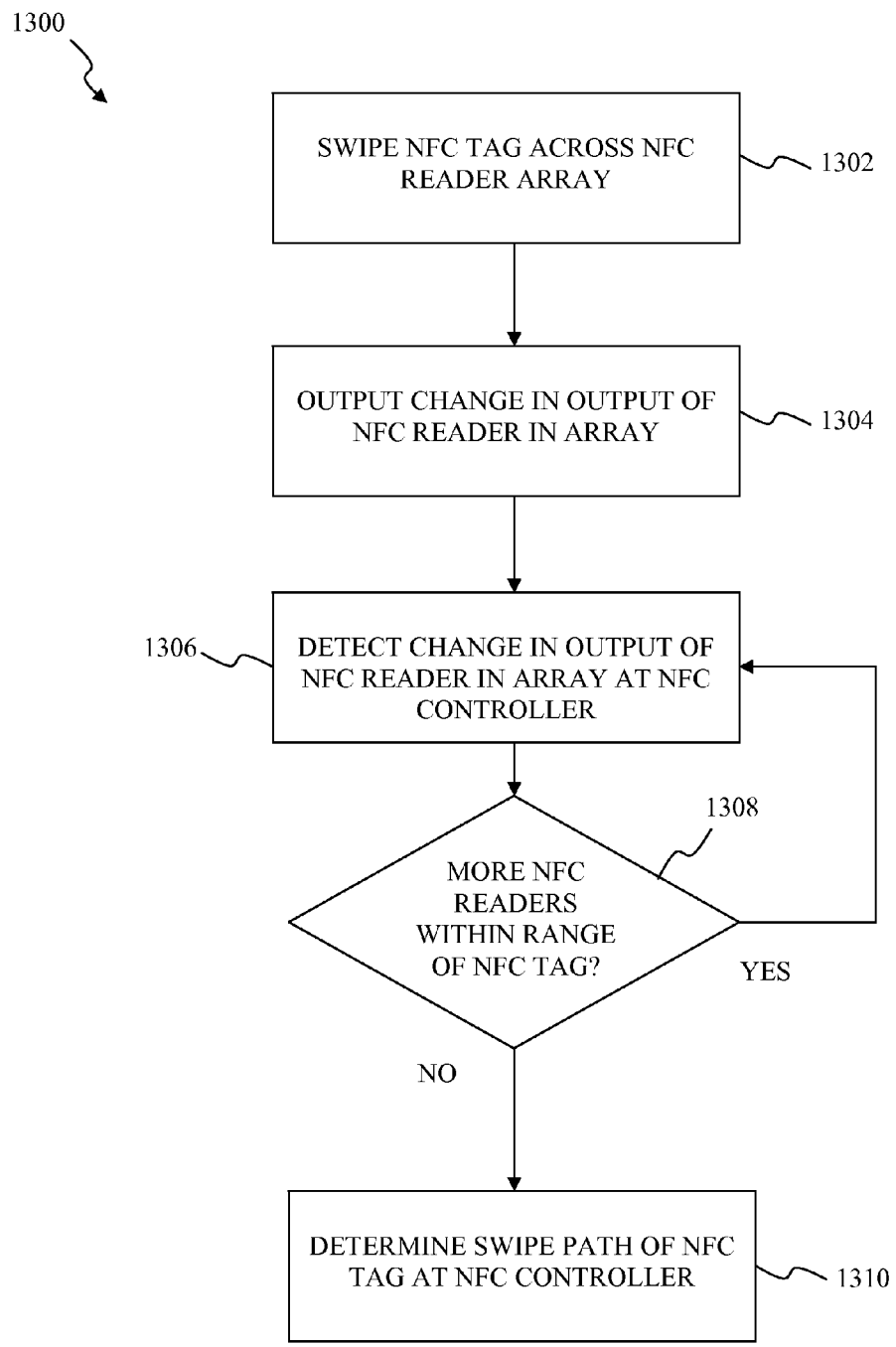
FIG. 13 is a flowchart of exemplary operational steps for context determination in a NFC reader array, according to an exemplary embodiment of the present disclosure.

FIG. 13 is a flowchart of exemplary operational steps for context determination, according to an exemplary embodiment of the present disclosure.

Method 1300 begins with step 1302. At step 1302, a NFC tag, or another type of NFC device capable of the target mode of operation, is swiped across a plurality of NFC coils in a NFC reader, or another type of NFC device capable of the initiator mode of operation, such as an NFC reader array. An exemplary device for the NFC device having a plurality of NFC coils could be the NFC-enabled device 204 in the initiator mode of operation, for example. An exemplary device for the NFC tag could be NFC capable device 202 in the target mode of operation, for example.

At step 1304, each NFC coil in the NFC reader array over which the NFC reader passes sends a signal indicating a change in the induced load of the respective coil to the NFC controller, caused by the NFC tag passing within the respective coil's generated magnetic field.

At step 1306, the NFC controller detects the change in the output of the coil of the NFC reader array over which the NFC tag is passing. In one example, the output of the coil is an analog voltage signal, which the NFC controller converts to a digital signal using an A/D converter.

At step 1308, a determination is made whether the NFC tag is passing within range of any more NFC coils within the NFC reader array. There are several ways to accomplish this, as will be apparent to those skilled in the relevant art(s).

At step 1310, the swipe path of the NFC tag through the NFC reader array is determined once the NFC tag is not within range of any more NFC coils of the NFC reader array.

This may be done, for example, by the NFC controller in the NFC device capable of the initiator mode of operation that has the NFC reader array.

CONCLUSION

It is to be appreciated that the Detailed Description section, and not the Abstract section, is intended to be used to interpret the claims. The Abstract section may set forth one or more, but not all exemplary embodiments, of the present disclosure, and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus the present disclosure should not be limited by any of the above-described exemplary embodiments, but should be defined only in accordance with the following claims and their equivalents.

What is claimed is:

1. A first near field communication (NFC) capable device, comprising:
    a primary inductive coupling element configured to generate a magnetic field;
    a plurality of secondary inductive coupling elements, the generated magnetic field being configured to induce a plurality of magnetic fields in the plurality of secondary inductive coupling elements, the plurality of secondary inductive coupling elements being configured to provide one or more detection signals from among a plurality of detection signals when a second NFC capable device causes one or more induced magnetic fields from among the plurality of induced magnetic fields to vary; and
    a controller module configured to analyze variations of the plurality of induced magnetic fields in relative time to each other to determine a motion of the second NFC capable device relative to the first NFC capable device based on the plurality of detection signals.

2. The first NFC capable device of claim 1, further comprising:
    a plurality of envelope detectors, each envelope detector from among the plurality of envelope detectors being coupled to a corresponding secondary inductive coupling element from among the plurality of secondary inductive coupling elements, the plurality of envelope detectors being configured to detect variations in the plurality of induced magnetic fields,
    wherein the controller module is configured to determine the motion based upon the variations.

3. The first NFC capable device of claim 2, wherein the controller module is configured to:
    select a stored motion from among a plurality of stored motions that corresponds to the motion, and
    execute a predetermined function that corresponds to the stored motion.

4. The first NFC capable device of claim 1, wherein the first NFC capable device is implemented as part of a corresponding NFC reader array from among a plurality of NFC reader arrays.

5. The first NFC capable device of claim 1, wherein the plurality of secondary inductive coupling elements is spatially arranged such that a first induced magnetic field from among the plurality of induced magnetic fields that is induced in a first secondary inductive coupling element from among the plurality of secondary inductive coupling elements is minimally affected by the second NFC capable device passing over a second secondary inductive coupling element from among the plurality of secondary inductive coupling elements.

6. The first NFC capable device of claim 1, wherein a first induced magnetic field from among the plurality of induced magnetic fields that is induced in a first secondary inductive coupling element from among the plurality of secondary inductive coupling elements changes from a first level to a second level when the second NFC capable device passes over a second secondary inductive coupling element from among the plurality of secondary inductive coupling elements.

7. The first NFC capable device of claim 6, wherein the controller module is configured to determine the second NFC capable device passes over the secondary inductive coupling element based on a change from the first level to the second level.

8. The first NFC capable device of claim 1, wherein a first induced magnetic field from among the plurality of induced magnetic fields that corresponds to a first secondary inductive coupling element from among the plurality of secondary inductive coupling elements changes at a first instance in time,
    wherein a second induced magnetic field from among the plurality of induced magnetic fields that corresponds to a second secondary inductive coupling element from among the plurality of secondary inductive coupling elements changes at a second instance in time, and
    wherein the controller module is configured to determine the second NFC capable device passed from the first secondary inductive coupling element at the first instance in time to the second secondary inductive coupling element at the second instance in time.

9. A first near field communication (NFC) capable device, comprising:
    a primary inductive coupling element configured to generate a magnetic field to communicate with a second NFC capable device;
    a plurality of secondary inductive coupling, elements, the generated magnetic field being configured to induce a plurality of magnetic fields in the plurality of secondary inductive coupling elements, the plurality of secondary inductive coupling elements being configured to provide a plurality of induced currents in response to the plurality of induced magnetic fields; and
    a controller module configured to determine a motion of the second NFC capable device relative to the first NFC capable device based on variations in the plurality of induced currents.

10. The first NFC capable device of claim 9, further comprising:
    a plurality of envelope detectors, each envelope detector from among the plurality envelope detectors being coupled to a corresponding secondary inductive coupling element from among the plurality of secondary inductive coupling elements, the plurality of envelope detectors being configured to detect the variations in the plurality of induced currents.

11. The first NFC capable device of claim 9, wherein the controller module is configured to:

select a stored motion from among a plurality of stored motions that corresponds to the motion, and execute a predetermined function that corresponds to the stored motion.

12. The first NFC capable device of claim 9, wherein the plurality of secondary inductive coupling elements is spatially arranged such that a corresponding induced magnetic field from among the plurality of induced magnetic fields coupled onto a first secondary inductive coupling element from among the plurality of secondary inductive coupling elements is minimally affected by the second NFC capable device passing over a second secondary inductive coupling element from among the plurality of secondary inductive coupling elements.

13. The first NFC capable device of claim 9, wherein a corresponding induced magnetic field from among the plurality of induced magnetic fields of a first secondary inductive coupling element from among the plurality of secondary inductive coupling elements changes from a first level to a second level when the second NFC capable device passes over a second secondary inductive coupling element from among the plurality of secondary inductive coupling elements.

14. The first NFC capable device of claim 13, wherein the controller module is configured to determine the second NFC capable device passes over the secondary inductive coupling element based on a change from the first level to the second level.

15. The first NFC capable device of claim 9, wherein the controller module is configured to analyze the variations in the plurality of induced currents in relative time to each other to determine the motion.

16. The first NFC capable device of claim 15, wherein a first induced current from among the plurality of induced currents that corresponds to a first secondary inductive coupling element from among the plurality of secondary inductive coupling elements changes at a first instance in time, wherein a second induced current from among the plurality of induced currents that corresponds to a second secondary inductive coupling element from among the plurality of secondary inductive coupling elements changes at a second instance in time, and wherein the controller module is configured to determine the second NFC capable device passed from the first secondary inductive coupling element at the first instance in time to the second secondary inductive coupling element at the second instance in time.

* * * * *

UNITED STATES PATENT AND TRADEMARK OFFICE
CERTIFICATE OF CORRECTION

| | | |
|---|---|---|
| PATENT NO. | : 9,306,626 B2 | Page 1 of 1 |
| APPLICATION NO. | : 13/473222 | |
| DATED | : April 5, 2016 | |
| INVENTOR(S) | : Hall et al. | |

It is certified that error appears in the above-identified patent and that said Letters Patent is hereby corrected as shown below:

In column 22, line 46, replace "coupling, elements" with --coupling elements--.

Signed and Sealed this
Sixteenth Day of August, 2016

Michelle K. Lee
*Director of the United States Patent and Trademark Office*